US011017504B2

(12) United States Patent
Trejo et al.

(10) Patent No.: US 11,017,504 B2
(45) Date of Patent: May 25, 2021

(54) LIGHT LEVEL ADAPTIVE FILTER AND METHOD

(71) Applicant: Intuitive Surgical Operations, Inc., Sunnyvale, CA (US)

(72) Inventors: Max J. Trejo, Menlo Park, CA (US); Jeffrey M. DiCarlo, Austin, TX (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 198 days.

(21) Appl. No.: 16/070,582

(22) PCT Filed: Jan. 27, 2017

(86) PCT No.: PCT/US2017/015485
§ 371 (c)(1),
(2) Date: Jul. 17, 2018

(87) PCT Pub. No.: WO2017/132600
PCT Pub. Date: Aug. 3, 2017

(65) Prior Publication Data
US 2020/0211161 A1 Jul. 2, 2020

Related U.S. Application Data

(60) Provisional application No. 62/288,956, filed on Jan. 29, 2016.

(51) Int. Cl.
*G06T 5/00* (2006.01)
*G06T 5/10* (2006.01)
*G06T 5/20* (2006.01)

(52) U.S. Cl.
CPC ............... *G06T 5/002* (2013.01); *G06T 5/10* (2013.01); *G06T 5/20* (2013.01);
(Continued)

(58) Field of Classification Search
CPC .. G06T 5/002; G06T 5/10; G06T 5/20; G06T 2207/20012; G06T 2207/20028; G06T 2207/20182
See application file for complete search history.

(56) References Cited

U.S. PATENT DOCUMENTS 8,059,207 B2 11/2011 Xu et al.
2007/0009175 A1* 1/2007 Lim ........................ G06T 5/002
382/275
(Continued)

FOREIGN PATENT DOCUMENTS

| JP | 2008263507 A | 10/2008 |
|----|--------------|---------|
| JP | 2012174275 A | 9/2012 |
| WO | WO-2012060128 A1 | 5/2012 |

OTHER PUBLICATIONS

Allontutorials, Bilateral Filter—Short Description and Matlab Source Code [online], Nov. 15, 2013, Retrieved from the Internet:<URL: http://allontutorials.com/bilateral-filter-short-description-and-matlab-source-code/>, 2 pages.
(Continued)

*Primary Examiner* — Sean T Motsinger

(57) ABSTRACT

A system includes an image sensor, an imaging pipeline, and a display device. The image sensor is configured to capture a first frame of pixel data. The imaging pipeline is coupled to the image sensor to receive the first frame of pixel data. The imaging pipeline includes an adaptive noise filter. The adaptive noise filter is configured to filter a pixel based on noise in the pixel. The imaging pipeline is configured to output a second frame of pixel data. The second frame of pixel data includes pixels filtered by the adaptive noise filter. The display device is coupled to the imaging pipeline to receive the second frame of pixel data. The display device being configured to display the second frame of pixel data.

20 Claims, 8 Drawing Sheets

(52) U.S. Cl.
CPC ............... *G06T 2207/20012* (2013.01); *G06T 2207/20028* (2013.01); *G06T 2207/20182* (2013.01)

(56) References Cited

U.S. PATENT DOCUMENTS

| | | | |
|---|---|---|---|
| 2007/0236609 A1 | 10/2007 | Pathak et al. | |
| 2008/0239094 A1* | 10/2008 | Baqai | H04N 1/00 348/223.1 |
| 2009/0141150 A1* | 6/2009 | Tsuruoka | H04N 5/361 348/242 |
| 2009/0278961 A1* | 11/2009 | Mohanty | G06T 5/50 348/241 |
| 2010/0220223 A1* | 9/2010 | Tsuruoka | G06T 5/002 348/242 |
| 2011/0228096 A1* | 9/2011 | Friel | H04N 5/33 348/164 |
| 2011/0274350 A1* | 11/2011 | Hara | G06T 5/20 382/167 |
| 2012/0081553 A1* | 4/2012 | Cote | H04N 9/045 348/207.1 |
| 2012/0251003 A1* | 10/2012 | Perbet | G06K 9/6224 382/173 |
| 2013/0083246 A1 | 4/2013 | Chen et al. | |
| 2013/0089247 A1* | 4/2013 | Mercuriev | G06T 5/002 382/128 |
| 2013/0107083 A1* | 5/2013 | Hsu | H04N 9/045 348/242 |
| 2013/0202080 A1* | 8/2013 | Yu | A61B 6/5258 378/19 |
| 2013/0216117 A1* | 8/2013 | Mercuriev | G06T 5/002 382/132 |
| 2013/0286172 A1* | 10/2013 | Sasaki | A61B 1/045 348/65 |
| 2014/0184916 A1 | 7/2014 | Steiner et al. | |
| 2017/0020475 A1* | 1/2017 | Spahn | A61B 6/5205 |
| 2017/0061584 A1* | 3/2017 | Lim | G06T 5/002 |
| 2017/0084007 A1* | 3/2017 | Rakhshanfar | H04N 5/21 |
| 2017/0318240 A1* | 11/2017 | Yu | H04N 5/357 |
| 2018/0007333 A1* | 1/2018 | Lim | H04N 9/646 |
| 2019/0392565 A1* | 12/2019 | Lakemond | G06T 5/002 |

OTHER PUBLICATIONS

Elad M., "On the Origin of the Bilateral Filter and Ways to Improve It," IEEE Transactions on Image Processing, Oct. 2002, vol. 11 (10), pp. 1141-1151.
Fransis J.J., et al., "The Bilateral Median Filter," 2003, 6 pages.
Paris S., et al., "Bilateral Filtering: Theory and Applications," Foundations and Trends in Computer Graphics and Vision, 2008, vol. 4 (1), pp. 1-73.
Prasad S.S., et al., "Image Enhancement with Noise Reduction in Spatial Domain," International Journal of Advanced Research in Computer Science and Software Engineering, Jan. 2015, vol. 5 (1), pp. 563-566.
International Search Report and Written Opinion for Application No. PCT/US2017/015485, dated May 24, 2017, 15 pages.
Qi M., et al., "Image Denoising Algorithm via Spatially Adaptive Bilateral Filtering," 2nd International Conference on Systems Engineering and Modeling, Jan. 2013, pp. 431-434.
Smolka B., "Improved Bilateral Filtering Scheme for Noise Removal in Color Images," The International Conference on Informatics and Applications, Jan. 2012, pp. 118-130.
Tomasi C., et al., "Bilateral Filtering for Gray and Color Images," Proceedings of the IEEE International Conference on Computer Vision, 1998, pp. 839-846.
Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.
Zhang B., et al., "Adaptive Bilateral Filter for Sharpness Enhancement and Noise Removal," IEEE International Conference on Image Processing, 2007, pp. IV-417-IV-420.
Zhang X., et al., "Enhancement and Noise Reduction of Very Low Light Level Images," Proceedings of the 21st International Conference on Pattern Recognition, Nov. 2012, pp. 2034-2037.
International Preliminary Report on Patentability for Application No. PCT/US2017/015485, dated Aug. 9, 2018, 12 pages.

\* cited by examiner

LIGHT LEVEL ADAPTIVE FILTER AND METHOD

RELATED APPLICATIONS

This patent application is the U.S. national phase of International Patent Application No. PCT/US2017/015485, filed Jan. 27, 2017, which designated the U.S. and which claims priority to and the benefit of the filing date of U.S. Provisional Patent Application No. 62/288,956, filed Jan. 29, 2016), each of which is incorporated by reference herein in its entirety.

BACKGROUND

Field of the Invention

The present invention relates generally to image pipelines for computer-assisted surgical system, and more particularly to adaptive filters used in image pipelines.

Description of Related Art

Surgical system 100 is a computer assisted surgical system that includes an endoscopic imaging system 192, a surgeon's console 194 (master), and a patient side support system 110 (slave), all interconnected by wired (electrical or optical) or wireless connections 196. One or more electronic data processors may be variously located in these main components to provide system functionality. Examples are disclosed in U.S. Patent Application Publication No. US 2008/0065105 A1, which is incorporated by reference herein.

Patient side support system 110 includes an entry guide manipulator 130. At least one surgical device assembly is coupled to entry guide manipulator 130. Each surgical device assembly includes either an instrument that in turn includes either a surgical instrument or an image capture unit. For example, in FIG. 1, one surgical device assembly includes an instrument 135-1 with a shaft 137-1 and an image capture unit that extends through entry guide 115 during a surgical procedure. Instrument 135-1 is sometimes referred to an endoscope, or alternatively as an imaging system device or camera instrument. Typically, entry guide 115 includes a plurality of channels.

Imaging system 192 performs image processing functions on, e.g., captured endoscopic imaging data of the surgical site and/or preoperative or real time image data from other imaging systems external to the patient. Imaging system 192 outputs processed image data (e.g., images of the surgical site, as well as relevant control and patient information) to a surgeon at surgeon's console 194. In some aspects, the processed image data is output to an optional external monitor visible to other operating room personnel or to one or more locations remote from the operating room (e.g., a surgeon at another location may monitor the video; live feed video may be used for training; etc.).

Surgeon's console 194 includes multiple degrees-of-freedom ("DOF") mechanical input devices ("masters") that allow the surgeon to manipulate the instruments, entry guide(s), and imaging system devices, which are collectively referred to as slaves. These input devices may in some aspects provide haptic feedback from the instruments and surgical device assembly components to the surgeon. Surgeon's console 194 also includes a stereoscopic video output display positioned such that images on the display are generally focused at a distance that corresponds to the surgeon's hands working behind/below the display screen. These aspects are discussed more fully in U.S. Pat. No. 6,671,581, which is incorporated by reference herein.

Control during insertion of the instruments may be accomplished, for example, by the surgeon moving the instruments presented in the image with one or both of the masters; the surgeon uses the masters to move the instrument in the image side to side and to pull the instrument towards the surgeon. The motion of the masters commands the imaging system and an associated surgical device assembly to steer towards a fixed center point on the output display and to advance inside the patient.

In one aspect, the camera control is designed to give the impression that the masters are fixed to the image so that the image moves in the same direction that the master handles are moved. This design causes the masters to be in the correct location to control the instruments when the surgeon exits from camera control, and consequently this design avoids the need to clutch (disengage), move, and declutch (engage) the masters back into position prior to beginning or resuming instrument control.

Base 101 of patient side support system 110 supports an arm assembly that includes a passive, uncontrolled setup arm assembly 120 and an actively controlled manipulator arm assembly 130. Actively controlled manipulator arm assembly 130 is sometimes referred to as entry guide manipulator 130. An entry guide manipulator assembly platform 132, sometimes referred to as platform 132, is coupled to a distal end of fourth manipulator link 119. An entry guide manipulator assembly 133 is rotatably mounted on platform 132. Arrow 190 shows the distal and proximal directions.

Entry guide manipulator assembly 133 includes an instrument manipulator positioning system. Entry guide manipulator assembly 133 rotates a plurality of instrument manipulators 140-1, 140-2 as a group around axis 125.

Each of a plurality of instrument manipulators 140-1, 14-2 is coupled to entry guide manipulator assembly 133 by a different insertion assembly 136. In one aspect, each insertion assembly 136 is a telescoping assembly that moves the corresponding instrument manipulator away from and towards entry guide manipulator assembly 133. In FIG. 1, each of the insertion assemblies is in a fully retracted position.

Each of the plurality of instrument manipulator assemblies 140-1, 140-2 includes a plurality of motors that drive a plurality of outputs in an output interface of that instrument manipulator. See U.S. Patent Application No. 61/866,115 (filed on 15 Aug. 2013), which is incorporated by reference, for one example of an instrument manipulator and a surgical instrument that can be coupled to the instrument manipulator.

Each of plurality of surgical device assemblies 180 includes a different of the plurality of instrument manipulator assemblies and an instrument including one of a surgical instrument and an image capture unit. Each of instruments 135-1, 135-2 includes a body that houses a transmission unit. The transmission unit includes an input interface including a plurality of inputs. Each of instruments 135-1, 135-2 also includes a shaft 137-1, 137-2 sometimes referred to as a main tube that extends in the distal direction from the body. An end effector is coupled to a distal end of the shaft of a surgical instrument assembly, and an image capture unit, e.g., a camera, is included in a distal end of a different surgical instrument assembly. See U.S. Patent Application No. 61/866,115 (filed on 15 Aug. 2013), which is incorporated by reference, for one example of an instrument manipulator assembly and a surgical instrument.

Each of instruments 135-1, 135-2 is coupled to the instrument mount interface of a corresponding instrument manipulator assembly 140-1, 140-2 so that a plurality of inputs in an input interface of the transmission unit in instrument 135-1, 135-2 are driven by plurality of outputs in the instrument mount interface of instrument manipulator assembly 140-1, 140-2. See U.S. Patent Application No. 61/866,115 (filed on 15 Aug. 2013).

As shown in FIG. 1, the shafts of plurality of surgical device assemblies 180 extend distally from bodies of the instruments. The shafts extend through a common cannula 116 placed at the entry port into the patient (e.g., through the body wall or at a natural orifice). In one aspect, an entry guide 11S is positioned within cannula 116, and each instrument shaft extends through a channel in entry guide 115, so as to provide additional support for the instrument shafts.

SUMMARY

A system includes an image sensor, an imaging pipeline, and a display device. The image sensor is configured to capture a first frame of pixel data. The imaging pipeline is coupled to the image sensor to receive the first frame of pixel data.

The imaging pipeline includes an adaptive noise filter. The adaptive noise filter is configured to filter a pixel using an estimated pixel noise parameter for the first pixel, and using a difference between a signal level of the first pixel and at least a signal level of a second pixel. The adaptive noise filter is also configured to output a second frame of pixel data. The second frame of pixel data includes pixels filtered by the adaptive noise filter.

The imaging pipeline is configured to output a frame of pixel data based on the second frame of adaptively noise filtered pixel data. Here, a frame of pixel data based on the second frame of adaptively noise filtered pixel data is a frame of pixel data that is the result of any further processing of the second frame of adaptively noise filtered pixel data by the imaging pipeline. The display device is coupled to the imaging pipeline to receive the frame of pixel data based on the second frame of adaptively noise filtered pixel data. The display device is configured to display the frame of pixel data based on the second frame of adaptively noise filtered pixel data.

In one aspect, the second pixel is at a same location in a third frame captured by the image sensor as a location of the first pixel in the first frame. The third frame was captured in time prior to the capture of the first frame, and so the difference in signal levels used by the adaptive noise filter is a temporal signal level change between pixels at the same location in two different frames. In another aspect, the difference between a signal level of the first pixel and at least a signal level of a second pixel is a difference between the signal level of the first pixel and the signal level of one of a plurality of pixels neighboring the first pixel, sometimes referred to as a plurality of neighboring pixels. The one of the plurality of neighboring pixels is the second pixel.

The adaptive noise filter includes an adaptive temporal noise filter. The adaptive temporal noise filter is configured to compare of a temporal change in the signal levels of the first and second pixels to an estimated pixel noise level of the first pixel. In this aspect, the estimated pixel noise level is the estimated pixel noise parameter. The adaptive temporal noise filter also is configured to output a pixel noise frame.

In one aspect, the imaging pipeline includes a plurality of stages and the adaptive temporal noise filter is included in a first stage of the plurality of stages. Also, each of the plurality of stages following a first stage of the plurality of stages is configured to process an input pixel noise frame and configured to output a stage dependent pixel noise frame.

In another aspect, the adaptive noise filter includes an adaptive spatial noise filter. The adaptive spatial noise filter is configured to determine a difference between the signal level of the first pixel and the signal level of each of a plurality of neighboring pixels. The adaptive spatial noise filter also uses a noise dependent signal level parameter, where the noise dependent signal level parameter is a function of the noise of the first pixel. In this aspect, the noise dependent signal level parameter is the estimated pixel noise parameter for the pixel in this aspect. In another aspect, the adaptive spatial noise filter includes a distance filter and a signal level range filter. The signal level range filter is configured to filter the pixel based on a difference between a signal level of a pixel and each of the signal levels of the plurality of neighboring pixels and based on the noise dependent signal level parameter. In one aspect, the noise dependent signal level parameter is a signal level range parameter.

In a further aspect, imaging pipeline stage includes an adaptive temporal noise filter including a signal level to noise look-up table. The adaptive temporal noise filter is configured to receive a frame of pixels; is configured to filter each pixel in a plurality of pixels of the frame by comparing a temporal change in a signal level of the pixel to a value in the signal level to noise look-up table corresponding to the signal level of the pixel; and is configured to output a frame of adaptively temporal noise filtered pixels based on the comparing.

In another aspect, an imaging pipeline stage includes a current pixel frame, a signal level to noise look-up table, a change look-up table, a pixel output frame, a pixel noise frame, and an adaptive temporal noise filter coupled to the current pixel frame, to the signal level to noise look-up table, to the change look-up table, to the pixel output frame, and to the pixel noise frame. The signal level to noise look-up table is configured to receive a signal level of a pixel of the current pixel frame and to output a noise standard deviation corresponding to the signal level of the pixel. The change look-up table is configured to receive a temporal change in the signal level of a pixel expressed in number of noise standard deviations and to output an allowed percentage of the temporal change in the signal level of the pixel to pass through the filter. The adaptive temporal noise filter is configured to output an adaptively temporal noise filtered pixel to the pixel output frame. The adaptive temporal noise filter also is configured to output pixel noise to the pixel noise frame, i.e., output pixel noise corresponding to the adaptively temporal noise filtered pixel.

In a still further aspect, an adaptive spatial noise filter is configured to receive an input pixel frame and an input pixel noise frame, and configured to filter a pixel of the input pixel frame based on spatial changes between the signal level of the pixel and the signal levels of a plurality of neighboring pixels and based on a noise dependent signal level parameter to produce an adaptively spatial noise filtered pixel. The noise dependent signal level parameter is determined using pixel noise in the input pixel noise frame corresponding to the pixel. The spatial filtering of the pixel is relative to a plurality of neighboring pixels in the input pixel frame. The adaptive spatial noise filter also is configured to output the adaptively spatial noise filtered pixel to an adaptively spatial noise filtered pixel frame.

In still another aspect, an imaging pipeline stage includes an input pixel frame and an input pixel noise frame. Each pixel noise element in the input pixel noise frame corresponds to a different pixel in the input pixel frame. The imaging pipeline stage further includes a pixel output frame and an adaptive spatial noise filter coupled to the input pixel frame, to the input pixel noise frame, and to the pixel output frame.

In one aspect, the adaptive spatial noise filter includes an adaptive spatial noise bilateral filter. For a pixel at a location x, the adaptive spatial noise bilateral filter is defined as:

$$\tilde{I}(x) = \frac{1}{C} \sum_{y \in N(x)} e^{-\frac{\|y-x\|^2}{2\sigma_d^2}} * e^{-\frac{|I(y)-I(x)|^2}{2\sigma(Noise)_r^2}} * I(y)$$

$$C = \sum_{y \in N(x)} e^{-\frac{\|y-x\|^2}{2\sigma_d^2}} * e^{-\frac{|I(y)-I(x)|^2}{2\sigma(Noise)_r^2}}$$

where
$\tilde{I}(x)$ is an adaptively spatial noise filtered signal level of the pixel at location x;
C is a normalization constant;

$$e^{-\frac{\|y-x\|^2}{2\sigma_d^2}}$$

is a spatial Gaussian distribution;
$\|y-x\|$ is a norm of the distance between a pixel at location y and the pixel at the location x;
$\sigma_d$ is a distance parameter;

$$e^{-\frac{|I(y)-I(x)|^2}{2\sigma(Noise)_r^2}}$$

is a signal level range Gaussian distribution that is a function of noise of the pixel at the location x;
I(y) is the signal level of the pixel at the location y;
I(x) is the signal level of the pixel at the location x;
|I(y)−I(x)| is an absolute value of a difference between the signal level of the pixel at the location y (a second pixel) and the signal level of the pixel at the location x (a first pixel);
$\sigma(Noise)_r$ is a signal level range parameter that is a function of the noise of the pixel at the location x;
N(x) is a block of pixels with a center pixel at the location x; and
$\Sigma_{y \in N(x)}$ represents a summation over the pixels in the block of pixels with a center pixel at the location x.

In one aspect, a method includes receiving a first pixel of a first frame and adaptively noise filtering the first pixel using an estimated pixel noise parameter for the first pixel and using a difference between a signal level of the first pixel and at least a signal level of a second pixel to obtain a filtered pixel. The filtered pixel is output to an output frame. The method also includes outputting pixel noise corresponding to the filtered pixel to a noise output frame.

In another aspect, the second pixel is at a same location in a second frame captured by the image sensor as a location of the first pixel in the first frame. The second frame is captured in time prior to the capture of the first frame. In this aspect, the adaptively noise filtering the first pixel includes adaptively temporal noise filtering the first pixel based on a comparison of a change in the signal levels of the first and second pixels, sometimes referred to as a temporal change in the signal level of the first pixel, to an estimated pixel noise level of the first pixel. The estimated pixel noise level is the estimated pixel noise parameter in this aspect.

The adaptively temporal noise filtering the first pixel includes inputting a signal level of the first pixel to a signal level to noise look-up table, and outputting by the signal level to noise look-up table a noise standard deviation corresponding to the signal level of the first pixel. The noise standard deviation is the estimated pixel noise level of the first pixel in this aspect. The adaptively temporal noise filtering the first pixel also includes dividing the temporal change in the signal level of the first pixel by the noise standard deviation to obtain a temporal change in the signal level of the first pixel in standard deviations of noise, the dividing being the comparison, the adaptively temporal noise filtering the first pixel further includes inputting the temporal change in the signal level of the first pixel in standard deviations of noise to a change look-up table, and outputting by the change look-up table an allowed percentage of temporal change in the signal level of the first pixel to pass through the filter. Finally, the adaptively temporal noise filtering the first pixel still further includes creating an allowed temporal change in the signal level of the first pixel by multiplying the allowed percentage of temporal change in the signal level of the first pixel by the temporal change in the signal level of the first pixel, and generating the filtered pixel by adding the allowed temporal change in the signal level of the first pixel to a corresponding pixel, the corresponding pixel is a pixel in a second frame, the second frame immediately preceding the first frame in time.

In yet another aspect, the at least one second pixel of the method is included in a plurality of pixels neighboring the first pixel, and the adaptively noise filtering the first pixel includes adaptively spatial noise filtering the first pixel based on a difference between a signal level of the first pixel and each of the signal levels of the plurality of neighboring pixels and based on a noise dependent signal level parameter. The noise dependent signal level parameter is a function of the noise of the first pixel, and the noise dependent signal level parameter is the estimated pixel noise parameter for the first pixel in this aspect.

The adaptively spatial noise filtering the pixel includes generating the filtered pixel by combining a distance filter and a signal level range filter, the signal level range filter is a function of the noise dependent signal level parameter. In particular, the signal level filter includes a signal level range Gaussian distribution having a signal level range parameter. The signal level range parameter is the noise dependent signal level parameter

Figure 1:
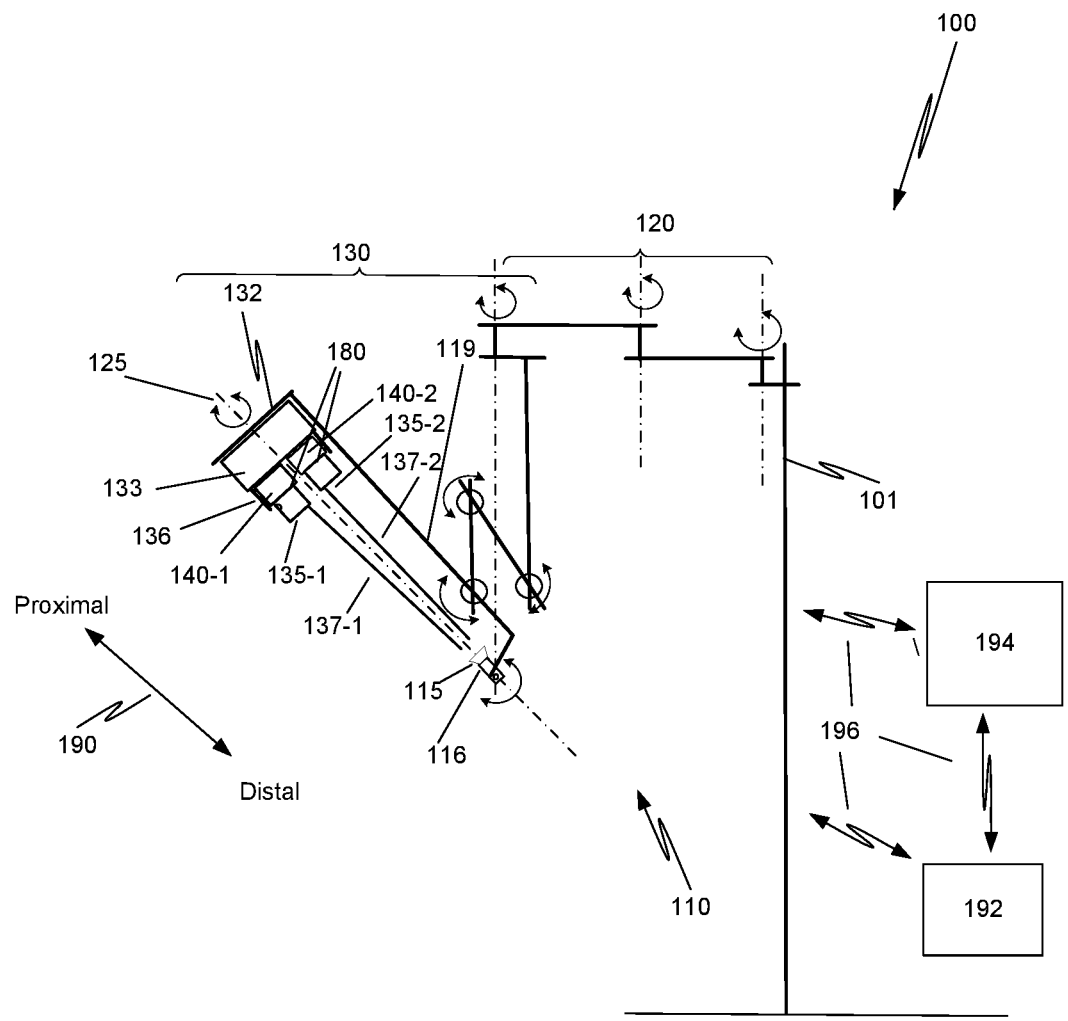
FIG. 1 is an illustration of a prior-art computer-assisted surgical system.
Figure 2:
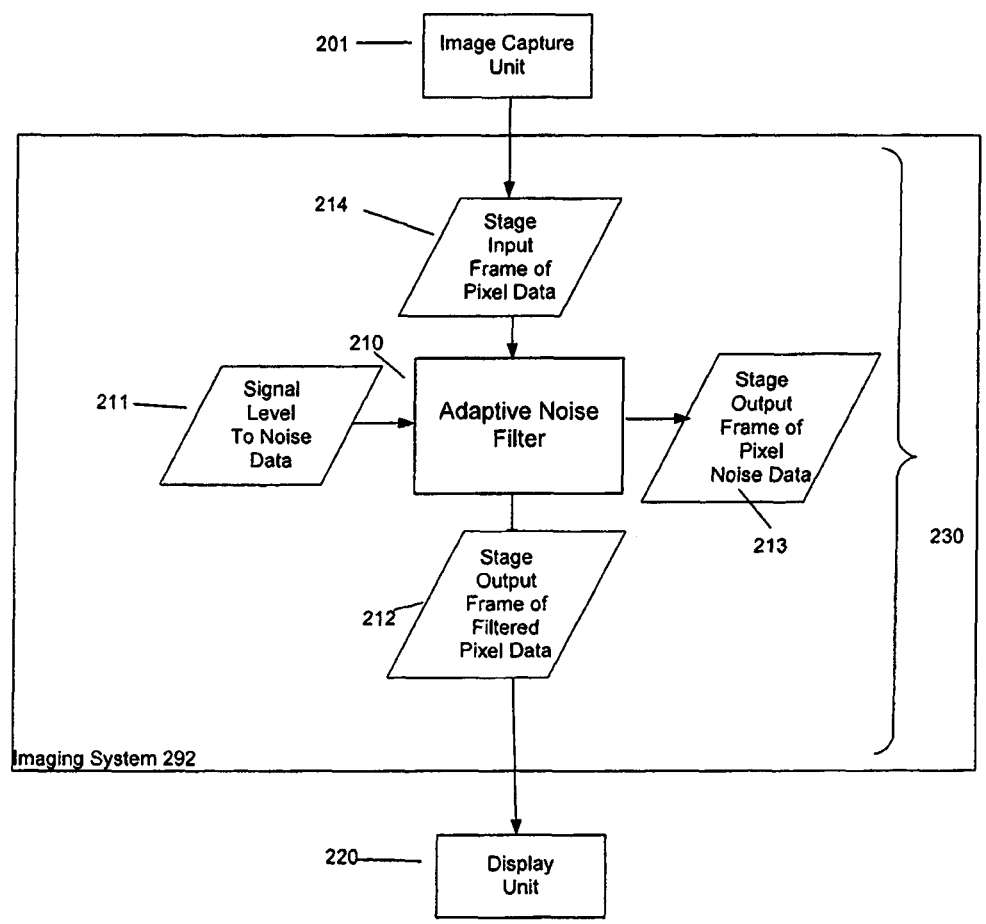
FIG. 2 is a diagram of an imaging system that includes an imaging pipeline having an adaptive noise filter.

In the drawings, the first digit of a three digit reference numeral is the figure number in which the element having that reference numeral first appeared.

DETAILED DESCRIPTION

An imaging pipeline, such as the imaging pipeline in endoscopic imaging system 192, contains many noise filters. These noise filters contain parameters based on noise expected in a scene. While these noise filters work well for captured frames having a given signal level, e.g., the signal level for which the parameters based on noise were selected, these noise filters have issues dealing with captured frames at different signal levels and with image frames containing varied signal levels.

These problems are solved by an imaging pipeline that includes one or more adaptive noise filters. Each of the adaptive noise filters selects noise dependent parameters associated with locally based signal levels, as measured by an image sensor in an image capture unit, e.g., a camera. The noise dependent parameters used in each of the adaptive noise filters can vary from image frame to image frame and can vary within an image frame from pixel to pixel. Specifically, the adaptive noise filters adjusts the noise filtering based on the signal level of the region of interest in the frame. In some examples, the region of interest is a pixel, while in other examples, the region of interest is a group of pixels, where the group of pixels includes more than a single pixel and less than the number of pixels in a frame. Each of the adaptive noise filters adaptively filters a pixel by comparing a value of a first pixel to a value of at least a second pixel, e.g., a temporal or spatial change, to an estimated pixel noise parameter for that pixel, where the estimated pixel noise parameter for a pixel is based on less than a total number of pixels in a frame of pixel data. Since the estimated pixel noise can vary from pixel to pixel, the adaptive filter compensates for such variations in the estimated pixel noise parameter.

In image capture sensors used in an endoscope and in other small image capture sensors, a pixel counts light photons incident on that pixel within an exposure time. Thus, the signal level of the pixel, sometimes called the value of the pixel, includes the count of incident photons over the exposure time. However, the count, i.e., the signal level, also may include a contribution associated with pixel noise. The pixel noise is dominated by electron (shot) noise and there is also an underlying contribution to the pixel noise due to electrical variations in the image capture sensor. The pixel noise is estimated as a square root function that deals with the variance in the number of electrons hitting the image capture sensor, e.g., the estimated pixel noise parameter is an estimated pixel noise level. The estimated pixel noise level, sometimes referred to as estimated pixel noise, in number of standard deviations can be estimated as:

$$\text{std}(\text{Noise}) = O + G * \sqrt{\frac{SignalLevel}{MaxSignalLevel}} \quad (1)$$

where
- std(Noise) is the standard deviation in noise for a pixel;
- O is an offset due to electrical noise in the sensor;
- G is a gain value;
- SignalLevel is the pixel signal level as read by the image capture sensor; and
- MaxSignalLevel is the maximum pixel signal level of the image capture sensor.

Here, pixel signal level SignalLevel is a measure of the light falling on the pixel in the image capture sensor. The above expression shows that at low pixel signal levels, the noise is much smaller than at high pixel signal levels. However, at low signal levels the noise makes up a much larger part of the signal than at high signal levels.

For example, consider an offset O of 2 and a gain G of 40, a first pixel with a pixel signal level SignalLevel of 6, and a second pixel with a pixel signal level SignalLevel of 4000. For this example, 12-bit pixels are being used, and so maximum pixel signal level MaxSignalLevel is 4095.

std(Noise of first pixel)=2+40*(6/4095)**0.5=3.5 std(Noise of second pixel)=2+40*(4000/4095)**0.5=41.5

Thus, the standard deviation of the estimated pixel noise for the second pixel is over ten times larger than the standard deviation of the estimated pixel noise for the first pixel. However, the standard deviation of the estimated pixel noise of the first pixel is about 58% of the pixel signal level of the first pixel while the standard deviation of estimated pixel noise of the second pixel is about 1% of the pixel signal level of the second pixel.

In one aspect, an image capture unit 201 captures a frame of pixel data and this frame of pixel data is processed by imaging pipeline 230 in imaging system 292. Typically, imaging pipeline 230 includes a plurality of stages. Imaging pipeline 230 in imaging system 292 is similar to the imaging pipeline in prior imaging system 192, except at least one of the noise filters in a stage of the imaging pipeline in prior imaging system 192 is replaced by adaptive noise filter 210.

Stage input frame of pixel data 214, sometimes referred as input frame 214, is a function of the pixel data input to a particular stage of imaging processing pipeline 230. Adaptive noise filter 210 in an imaging pipeline 230 of imaging system 292 operates by making a determination whether a change in signal level of a pixel in input frame 214 is noise or a real change. A real change is a change that is due to an actual change in signal level and not a change due to noise. If adaptive noise filter 210 determines that the change in signal level of a pixel is due to noise, adaptive noise filter 210 filters the pixel and passes the filtered pixel to filtered frame of pixel data 212. Conversely, if adaptive noise filter 210 determines that the change in signal level of that pixel is due to a change in signal level, i.e., is a real change, adaptive noise filter 210 passes the pixel through unfiltered to filtered frame of pixel data 212. Adaptive noise filter 210 makes the determination of whether the change in signal level of a pixel is due to noise by comparing a change of signal level associated with the pixel to an estimated pixel noise parameter for that pixel and then filtering the pixel based on the comparison.

Thus, adaptive noise filter 210 looks at each pixel in at least a region of interest within a frame captured by an image capture sensor of image capture unit 201 and processes any signal level change in each pixel, e.g., a change over time or a spatial change between neighboring pixels, based on whether the signal level change is deemed to be caused only by noise. This adaptive noise filtering results in a better image being displayed on display unit 220 than was obtained using prior art noise filters.

In prior art noise filters, if parameters used in the noise filter were targeted at noise for low signal levels, noise in pixels indicative of high signal levels was simply passed through the filter. As a result, the noise in high signal levels of a scene displayed on display unit could cause the bright regions in the displayed scene to change from frame to frame, which in turn caused noise induced flicker in the displayed scene.

Conversely, if the parameters used in the prior art noise filter were targeted at noise for high signal levels, pixels having low signal levels would be over filtered because everything would be determined to be noise. Consequently, any information in the low signal level pixels would be lost.

The adaptive noise filters described herein overcome these problems by adjusting the noise filtering based on the signal level of each pixel. Thus, the filtering for low signal levels is different from the filtering for high signal levels— the estimated pixel noise in a pixel changes as the signal level changes—, and the filtering is adjusted to preserve the information conveyed by each pixel while smoothing any contribution due to noise so that the effect of pixel noise in the displayed image is not apparent. For example, adaptive noise filter 210 uses the signal level of a pixel to access the noise for that pixel in a signal level to noise data 211. Signal level to noise data 21 has the appropriate noise parameter for each signal level over the range of possible signal levels for a pixel. By comparing any change in the signal level of a pixel to a noise level for that pixel from signal level to noise data 211, adaptive noise filter 210 assures that each pixel is appropriately filtered based on the noise for the signal level of that pixel. This greatly reduces or eliminates the problems encountered with the prior art noise filters that attempted to use the same parameters over a complete scene in a frame of pixel data.

In one aspect, adaptive noise filter 210 saves a noise value for each pixel, e.g., saves pixel noise, in an output frame of pixel noise data 213, sometimes referred to as noise frame 213. In one aspect, the values in pixel noise data 213 are expressed in noise standard deviations. Noise frame 213 is passed through pipeline 230 and processed by each stage of pipeline 230. Consequently, each stage of pipeline 230 has a representation of the noise input to that stage, which can be used in any adaptive noise filtering implemented in that stage.

As explained more completely below, in one aspect, imaging pipeline 230 includes an adaptive temporal noise filter in an initial stage of imaging pipeline 230. When adaptive noise filter 210 is an adaptive temporal noise filter, stage input frame of pixel data 214 is an input frame of raw pixel data from an image capture sensor in image capture unit 201.

In another aspect, imaging pipeline 230 includes an adaptive spatial noise filter in a later stage of imaging pipeline 230. When adaptive noise filter 210 is an adaptive spatial noise filter, stage input frame of pixel data 214 is, for example, an input frame of demosaiced and color transformed pixel data.

In still another aspect, imaging pipeline 230 includes both an adaptive temporal noise filter in an initial stage of an imaging pipeline and an adaptive spatial noise filter in a later stage of the imaging pipeline. See FIG. 5.

When adaptive noise filter 210 is an adaptive temporal noise filter, a value of a current pixel, a first pixel, at a location in a current frame of raw pixel data is compared with the value of a preceding filtered pixel, a second pixel, at the same location in a frame of filtered data immediately preceding the current frame in time. Here, raw pixel data refers to data from image capture unit 201 that has not yet been demosaiced. The difference in the two values of the two pixels, i.e., the temporal change in the current pixel, is used to determine whether the difference in the values of the two pixels is due to noise or is a real change.

In one aspect, the standard deviation of noise—the estimated pixel noise parameter—for the value (signal level) of the current pixel is obtained by adaptive noise filter 210 from signal level to noise data 211. Next, the temporal change in the current pixel is divided by the standard deviation of noise to obtain a temporal signal change in terms of the number of standard deviations of noise. The temporal signal change in terms of the number of standard deviations of noise is used to determine what percentage of the temporal change in the current pixel to allow to pass through filter 210. Thus, filter 210 compares the temporal signal change of the current pixel to an estimated pixel noise parameter, e.g., an estimated pixel noise level, for the current pixel and bases the filtering on the comparison. In one aspect, an adaptively temporal noise filtered pixel is defined as the percent of the temporal change of the current pixel plus value of the second pixel. The value of the adaptively temporal noise filtered pixel is placed in stage output frame of filtered pixel data 212, sometimes referred to as output frame 212. If the allowed percentage of the temporal change of the current pixel allowed to pass though filter 210 is one hundred percent, the current pixel is passed through the adaptive temporal noise filter unchanged. If the allowed percentage of the temporal change of the current pixel allowed to pass though filter 210 is smaller than one hundred percent, the current pixel is filtered based on its signal level. Output frame 212 continues through imaging pipeline 230 and is displayed on display unit 220. Thus, a frame is sent to display unit 220 by imaging pipeline 230 that is based on output frame 212, i.e., the frame sent to display unit 220 is output frame 212 after output frame 212 is processed by any subsequent stages in imaging pipeline 230.

When adaptive noise filter 210 is an adaptive spatial noise filter, a value of a current pixel at a location in a current frame of demosiaced and color transformed pixel data is compared with the values of neighboring pixels in the current frame. The percentage of the spatial change of current pixel that is passed through the filter, as an adaptively spatial noise filtered pixel, is weighted based on the spatial relationship of the current pixel to the neighboring pixels; based on the signal level relationship of the current pixel to the signal level of neighboring pixels; and based on the noise component of the current pixel. In one aspect, as explained more completely below, the adaptive spatial noise filter is configured to filter the pixel based on a spatial change between the signal level of the pixel and the signal levels of a plurality of neighboring pixels, and based on a noise dependent signal level parameter. The noise dependent signal level parameter is a function of the noise of the current pixel. Here, for this aspect, the noise dependent signal level parameter is the estimated pixel noise parameter for the pixel. The stage output frame 212 continues through imaging pipeline 230 and is displayed on display unit 220.

Figure 3A:
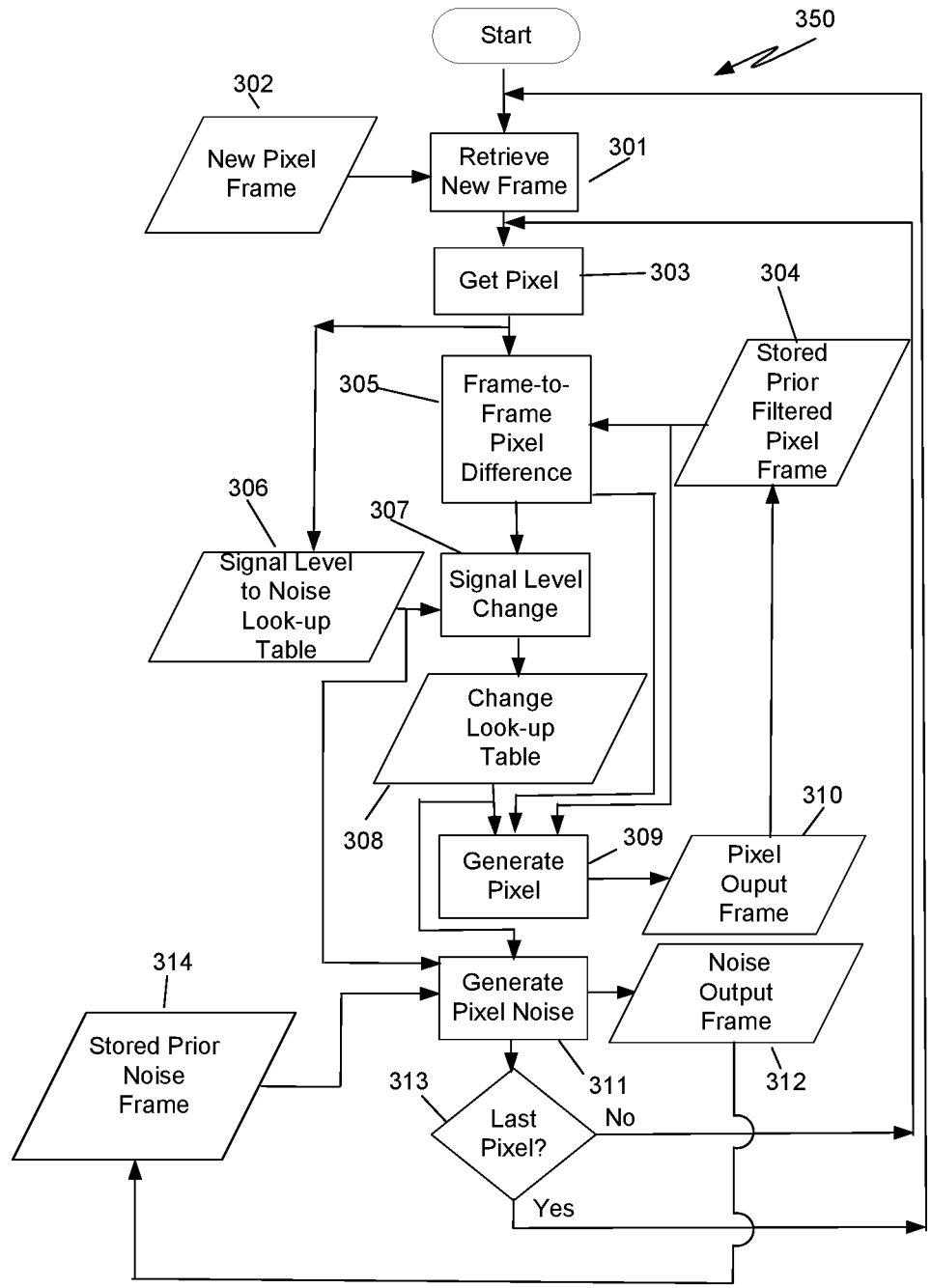
FIG. 3A is a method of implementing an adaptive temporal noise filter.
Figure 3B:
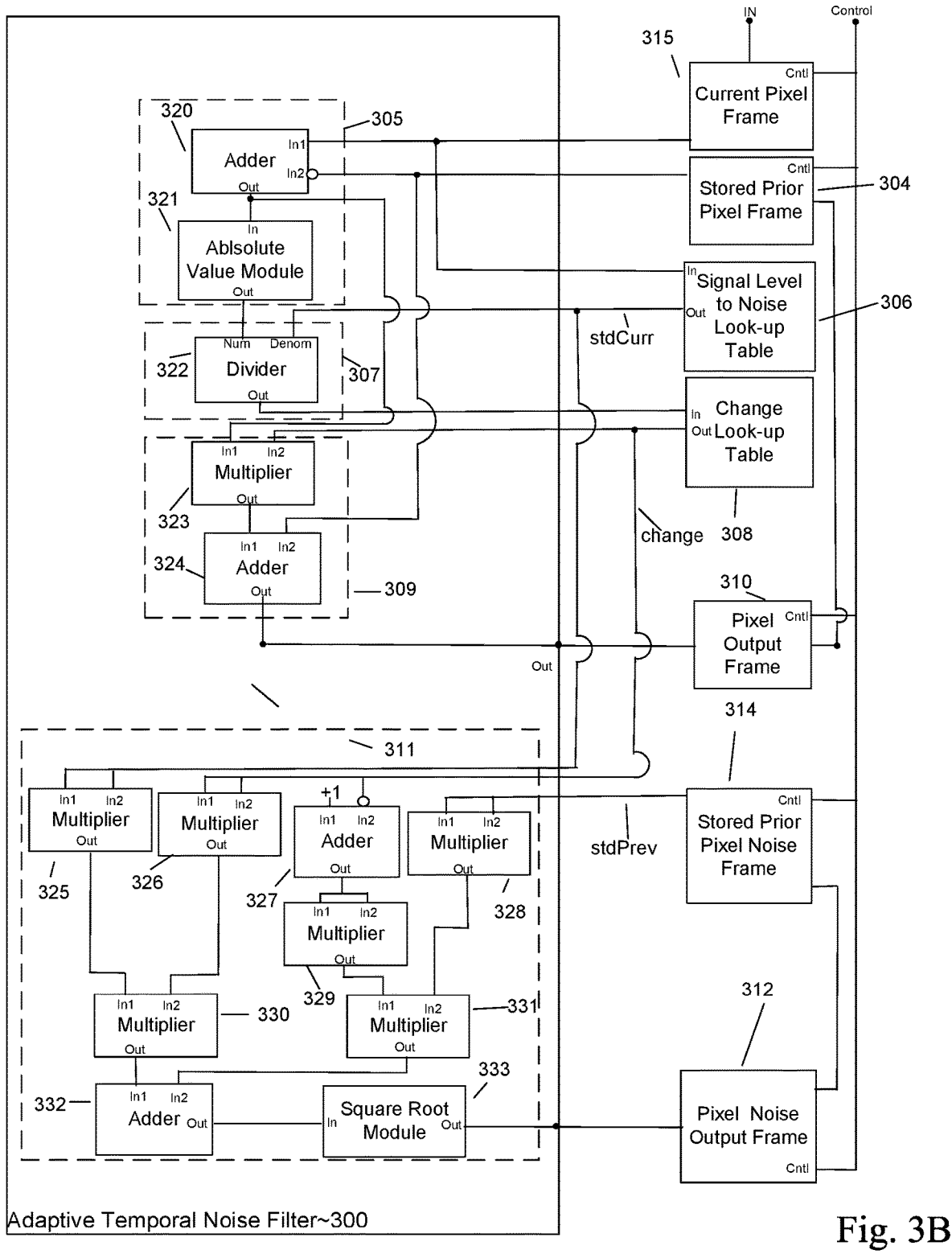
FIG. 3B is a diagram of an adaptive temporal noise filter.

FIG. 3A is a process flow diagram for one implementation of an adaptive temporal noise filter that can be used in imaging pipeline 230. FIG. 3B is a block diagram of one implementation of method 350 of FIG. 3A in an adaptive temporal noise filter 300.

In this example, pixels in a current pixel frame 315 (FIG. 3B) are described as being processed sequentially. This is illustrative only and is not intended to be limiting. In view of this disclosure, multiple pixels could be processed in parallel, pixels in the frame could be processed as group, or in some other matter. The process flow diagram of FIG. 3A is intended to show that each pixel in current pixel frame 315 (FIG. 3B) is processed to determine whether a temporal change in a current pixel is due to noise. In some aspects, it is not necessary to process all the pixels in a frame. Thus, at least pixels in an area of interest of the frame, e.g., a plurality of pixels in the frame, are typically processed by adaptive temporal noise filter 300, where the area of interest is known and specified to be a particular portion of a pixel frame.

Initially, RETRIEVE NEW FRAME process 301 retrieves a new pixel frame 302 from an image capture sensor in image capture unit 210. Retrieved new pixel frame 302 is saved as current pixel frame 315 (FIG. 3B). RETRIEVE NEW FRAME process 301 transfers to GET PIXEL process 303.

GET PIXEL process 303 retrieves a first pixel from current pixel frame 315 (FIG. 3B) and a second pixel corresponding to the first pixel from a stored prior filtered pixel frame 304. Sometimes, the first pixel from current pixel frame 315 is referred to as the current pixel. Stored prior filtered pixel frame 304 is a filtered pixel frame for a time immediately preceding the time associated with current pixel frame 315. If current pixel frame 315 is for time t, stored prior filtered pixel frame 304 is for time t−1. Here, the second corresponding pixel from stored prior filtered pixel frame 304 is the pixel at the same location in frame 304 as the location of the first pixel in frame 315. Herein, when it said that a pixel is retrieved, it is the value of the pixel that is retrieved. The value of the pixel represents the signal level. GET PIXEL process 303 transfers to FRAME-TO-FRAME PIXEL DIFFERENCE process 305.

FRAME-TO-FRAME PIXEL DIFFERENCE process 305 first determines the temporal change between the first and second pixels, e.g., determines the temporal change in value of the first pixel at time t from the value of the second pixel at time t−1. FRAME-TO-FRAME PIXEL DIFFERENCE process 305 supplies the temporal change in value of the first pixel to GENERATE PIXEL process 309.

Next, FRAME-TO-FRAME PIXEL DIFFERENCE process 305 takes the absolute value of the temporal change of the first pixel. FRAME-TO-FRAME PIXEL DIFFERENCE process 305 supplies the absolute value of the temporal change of the first pixel to SIGNAL LEVEL CHANGE process 307.

SIGNAL LEVEL CHANGE process 307 not only receives the absolute value of the temporal change of the first pixel, but also receives a value from SIGNAL LEVEL TO NOISE LOOK-UP TABLE 306. (Herein, capitalization and lower case are not used to differentiate between elements. For example, SIGNAL LEVEL TO NOISE LOOK-UP TABLE 306 (FIG. 3A), Signal Level to Noise Look-up Table 306 (FIG. 3B), and signal level to noise look-up table 306 are all the same element.)

Figure 4A:
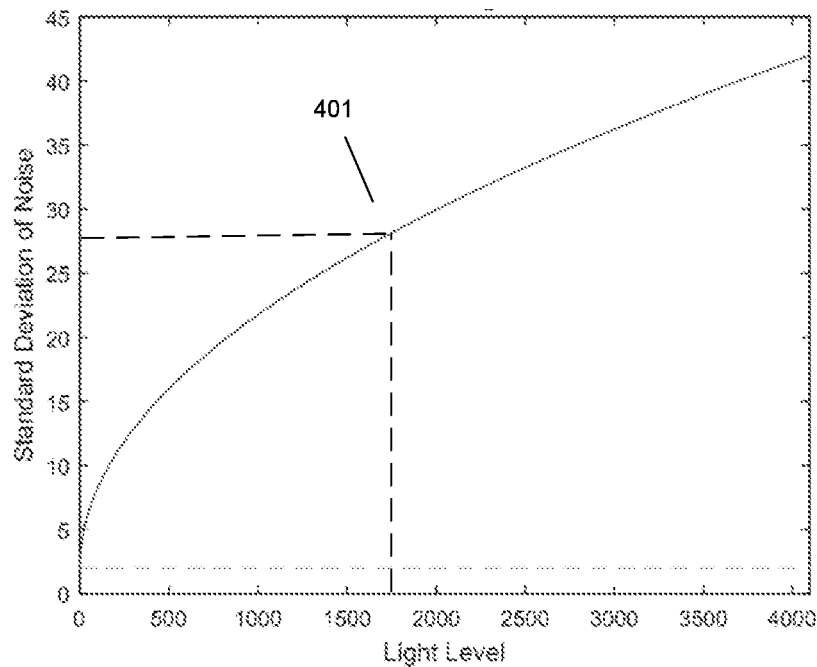
FIG. 4A is a graphical illustration of data included in a signal level to noise look-up table in the aspects of FIGS. 3A and 3B.

FIG. 4A is a graphical representation of data in SIGNAL LEVEL TO NOISE LOOK-UP TABLE 306, in one aspect. In this aspect, noise definition (1) above was used with an offset O of 2, a gain G of 40, and a maximum pixel signal level MaxSignalLevel of 4095 to generate curve 401. Curve 401 is illustrative only and is not intended to be limiting to this specific example. In view of the disclosure, one knowledgeable in the field can generate a SIGNAL LEVEL TO NOISE LOOK-UP TABLE 306 that represents the characteristics of the image sensor and associated gain used to provide a frame to the imaging pipeline.

In FIG. 4A, the signal level is plotted along the horizontal x-axis and the standard deviation of noise is plotted along the vertical y-axis. Thus, when SIGNAL LEVEL TO NOISE LOOK-UP TABLE 306 receives the value of the current pixel, which is a value along the x-axis, from GET PIXEL process 303, SIGNAL LEVEL TO NOISE LOOK-UP TABLE 306 outputs the value of curve 401 along the y-axis for the value of the current pixel. For example, assume the signal level of the current pixel is 1750, which is the value of the current pixel. When SIGNAL LEVEL TO NOISE LOOK-UP TABLE 306 receives an input value of 1750, SIGNAL LEVEL TO NOISE LOOK-UP TABLE 306 outputs a standard deviation value of 28.1 for the current pixel. This look-up is represented by the dashed lines in FIG. 4A.

In one aspect, SIGNAL LEVEL TO NOISE LOOK-UP TABLE 306 includes an entry of each of the possible signal levels of the current pixel. However, it is also possible to use a smaller number of entries and then use interpolation between entries. SIGNAL LEVEL TO NOISE LOOK-UP TABLE 306 not only supplies the standard deviation of noise for the signal level of the current pixel to SIGNAL LEVEL CHANGE process 307, but also to GENERATE PIXEL NOISE process 311.

SIGNAL LEVEL CHANGE process 307 determines the number of standard deviations contained in the temporal change of the first pixel, i.e., the absolute value of the temporal change in value of the first pixel (the current pixel) is divided by the noise standard deviation input value received from SIGNAL LEVEL TO NOISE LOOK-UP TABLE 306. Thus, the change in the value of the first pixel is compared to an estimated pixel noise level for the first pixel, which in this example is the estimated pixel noise parameter. The number of standard deviations contained in the absolute value of the temporal change is input to CHANGE LOOK-UP TABLE 308.

Figure 4B:
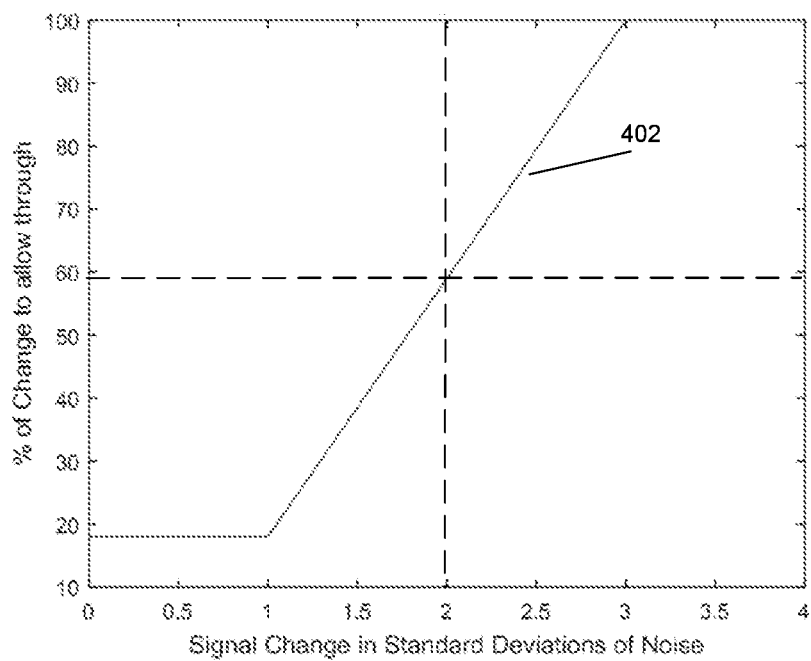
FIG. 4B is a graphical illustration of data included in change look-up table in the aspects of FIGS. 3A and 3B.

A graphical representation of the data contained in CHANGE LOOK-UP TABLE 308 is presented in FIG. 4B. The range of possible input values of the temporal signal change of the current pixel in standard deviations of noise is presented along the horizontal x-axis, and in this example, the possible input values range from zero to four standard deviations. Curve 402 represents the output in percent change to allow through the adaptive temporal noise filter for each of the possible input values, and the value of the curve for a given input is read from the vertical y-axis as a percent of the temporal change in the current pixel to allow to pass through the filter.

As shown by curve 402, for temporal changes of the current pixel of one noise standard deviation or less, about nineteen percent—a first constant fixed percentage—of the temporal change of the current pixel is allowed to pass through the filter. For temporal changes of the current pixel of three noise standard deviations or more, one hundred percent—a second constant fixed percentage—of the temporal change of the current is allowed to pass through the filter, i.e., the current pixel is passed through the filter unfiltered. For temporal changes of the current pixel of more than one noise standard deviation but smaller than three noise standard deviations, the percentage of temporal change allowed to pass though the filter changes linearly from about nineteen percent of the temporal change in the current pixel for one noise standard deviation to one hundred percent for three noise standard deviations.

For example, for an input value of two standard deviations of noise in the temporal change of the current pixel, CHANGE LOOK-UP TABLE 308 outputs a value of about 59%, which is the percent of the temporal change in the current pixel that is allowed to pass through the filter. This example look-up is represented by the dashed lines in FIG. 4B.

In one aspect, CHANGE LOOK-UP TABLE 308 is not used, and is replaced by a piecewise function as shown in FIG. 4B. For a more complicated curve than the one illustrated in FIG. 4B, the curve is implemented in CHANGE LOOK-UP TABLE 308 with about 512 entries.

Thus, in response to the number of standard deviations contained in the absolute value of the temporal change for the current pixel input to CHANGE LOOK-UP TABLE 308, CHANGE LOOK-UP TABLE 308 outputs the corresponding percent change to allow through the adaptive temporal noise filter ("change") for the current pixel. The percent change to allow through the adaptive temporal noise filter ("change") for the current pixel is supplied to GENERATE PIXEL process 309 and to GENERATE PIXEL NOISE process 311.

GENERATE PIXEL process 309 receives as inputs: the percent of the temporal change in the current pixel that is allowed to pass through the filter from CHANGE LOOK-UP TABLE 308, the temporal change in the current pixel from FRAME-TO-FRAME PIXEL DIFFERENCE process 305, and the value of the second pixel from stored prior filtered pixel frame 304. GENERATE PIXEL process 309 multiplies the percent of the temporal change in the current pixel that is allowed to pass through the filter from CHANGE LOOK-UP TABLE 308 by the temporal change in the current pixel from FRAME-TO-FRAME PIXEL DIFFERENCE process 305, and then adds the result to the value of the second pixel from stored prior filtered pixel frame 304 to obtain the adaptively temporal noise filtered pixel that is passed to pixel output frame 310. Thus, an adaptively filtered output pixel is output based on the comparing described above.

GENERATE PIXEL NOISE process 311 receives inputs: percent change to allow through the adaptive temporal noise filter ("change"), the noise standard deviation ("stdCurr") for the signal level of the current pixel, and the noise standard deviation ("stdPrev") for the signal level of the corresponding filtered pixel in the immediately preceding frame in time. The noise standard deviation stdPrev for the signal level of the corresponding pixel in the immediately preceding frame in time is received from a stored prior pixel noise frame 314, which is the frame of pixel noise standard deviations generated by the adaptive noise filter for the immediately preceding time.

GENERATE PIXEL NOISE process 311 generates a pixel noise standard deviation ("stdOut") for the current filtered pixel. Pixel noise standard deviation stdOut for the current filtered pixel, in this aspect, is defined as:

$$\text{stdOut} = \sqrt{(1-\text{change})^2 * \text{stdPrev}^2 + \text{change}^2 * \text{stdCurr}^2}$$

GENERATE PIXEL NOISE process 311 writes pixel noise standard deviation stdOut for the current filtered pixel to pixel noise output frame 312, sometimes referred to as noise output frame 312. The current pixel noise represents a noise component of the adaptively temporal noise filtered pixel. GENERATE PIXEL NOISE process 311 transfers processing to LAST PIXEL check process 313.

LAST PIXEL check process 313 determines whether all the pixels in the current pixel frame have been filtered. If all the pixels have been filtered, LAST PIXEL check process 313 transfers to RETRIEVE NEW FRAME process 301, and otherwise transfers to GET PIXEL process 303.

When all the pixels of interest in a frame have been filtered, pixel output frame 310, which is referred to as a frame of filtered pixels, is moved to stored prior filtered pixel frame 304. Also, pixel noise output frame 312 is moved to stored prior pixel noise frame 314, sometimes referred to as stored prior noise frame 314.

Method 350 of FIG. 3A adaptively temporal noise filters each pixel in at least a region in a frame and adjusts the filter based on the estimated pixel noise in that pixel. In addition, the method generates a pixel noise output frame that is processed by each stage of the imaging pipeline until another filter stage is reached so that a noise contribution to each pixel is available to each filter stage of the imaging pipeline. Each filter stage includes the option of generating a pixel noise output frame from that stage.

Adaptive temporal noise filter 300 is one example of a filter that performs method 350 of FIG. 3A. Adaptive temporal noise filter 300 includes a first adder 320, an absolute value module 321, a divider 322, a multiplier 323, a second adder 324, a second through seventh multiplier 325, 326, 328, 329, 330, and 331, a third and a fourth adder 327 and 332, and a square root module 333. Adaptive temporal noise filter 300 is connected to a current pixel frame 315, a stored prior filtered pixel frame 304, a signal level to noise look-up table 306, a change look-up table 308, a pixel output frame 310, a pixel noise output frame 312, and a stored prior pixel noise frame 314. In one aspect, each of current pixel frame 315, stored prior filtered pixel frame 304, signal level to noise look-up table 306, change look-up table 308, pixel output frame 310, pixel noise output frame 312, and stored prior pixel noise frame 314 is stored in memory. In this example, pixel output frame 310 is coupled to stored prior filtered pixel frame 304 so that pixel output frame 310 can be moved to stored prior filtered pixel frame 304. Similarly, pixel noise output frame 312 is coupled to stored prior pixel noise output frame 314 so that pixel noise output frame 312 can be moved to stored prior pixel noise output frame 314.

Showing current pixel frame 315, stored prior filtered pixel frame 304, signal level to noise look-up table 306, change look-up table 308, pixel output frame 310, pixel noise output frame 312 and stored prior pixel noise frame 314 as being separate from adaptive temporal noise filter 300 is illustrative only. For example, adaptive temporal noise filter 300 could have been drawn in FIG. 3B to include all or some combination of current pixel frame 315, stored prior filtered pixel frame 304, signal level to noise look-up table 306, change look-up table 308, pixel output frame 310, pixel noise output frame 312, and stored prior pixel noise frame 314.

To implement GET PIXEL process 303, signals on line Control drive the first pixel from current pixel frame 315, sometimes referred to as frame 315, on first input In1 of adder 320 of adaptive temporal noise filter 300 and the second pixel from stored prior filtered pixel frame 304, sometimes referred to as frame 304, to an inverting second input In2 of adder 320. As noted above, the first pixel is sometimes referred to as the current pixel. Also, when it said that a pixel is driven on or supplied to an input, it means the value of the pixel is on the input.

The current pixel is also supplied to input In of Signal Level to Noise Look-up Table 306 of adaptive temporal noise filter 300. The second pixel from stored prior filtered pixel frame 304 is also supplied to a second input In2 of second adder 324

Adder 320 subtracts the value of the second pixel from stored prior filtered pixel frame 304 from the value of the first pixel from current pixel frame 315. The difference between the two pixels, i.e., the temporal change in the first pixel, is supplied to a first input In1 of multiplier 323 of adaptive temporal noise filter 300 and to an input IN of an absolute value module 321. Absolute value module 321 takes the absolute value of the temporal difference between the two pixels. The absolute value of the temporal difference of the two pixels is supplied to a numerator input NUM of divider 322. In this aspect, adder 320 and absolute value module 321 are used to implement FRAME-TO-FRAME PIXEL DIFFERENCE process 305.

In response to the value of the current pixel on input In of Signal Level to Noise Look-up Table 306, Signal Level to Noise Look-up Table 306 outputs the noise standard deviation corresponding to the input signal level as represented by the value of the current pixel on input In. The output noise standard deviation is supplied to a second input of divider 322—input DENOM—and to both inputs of multiplier 325.

SIGNAL LEVEL CHANGE process 307 is implemented in adaptive temporal noise filter 300 by divider 322. As explained above, the absolute value of the difference of the two pixels, i.e., the absolute value of the temporal change of the current pixel, is received on a first input Num of divider 322. As just explained, signal level to noise look-up table 306 (FIG. 3B) receives the value of the current pixel on input In, and in response to the input outputs a noise standard deviation corresponding to the input value. See FIG. 4A. The noise standard deviation is provided to a second input Denom of divider 322.

Divider 322 divides the value on first input Num by the value on second input Denom and the result is on output Out. The result on output Out of divider 322 is supplied to an input In of Change Look-up Table 308. Thus, divider 322 divides the absolute value of the temporal change of the current pixel by the noise standard deviation of the current pixel to obtain the temporal signal change in standard deviations of noise, which is input to Change Look-up Table 308.

In response to the input temporal signal change in standard deviations of noise, Change Look-up Table 308 outputs the percent of the temporal change to allow through filter 300. See FIG. 4B. The percent of the temporal change to allow through filter 300 is supplied to a second input In2 of multiplier 323, to an inverting second input In2 of adder 327, and to both inputs of multiplier 326.

Thus, multiplier 323 receives the percent of the temporal change to allow through filter 300 on second input In2 and the temporal change in the first pixel on first input IN1. Multiplier 323 multiplies the two inputs to obtain the temporal change to allow through filter 300. The temporal change to allow through filter 300 is output on output Out of multiplier 323 and is supplied to a first input In1 of second adder 324.

Adder 324 receives the temporal change to allow through filter 300 on first input In1 and the value of the second pixel from stored prior filtered pixel frame 304 on second input In2. (Recall that as used here, the second pixel from stored prior filtered pixel frame 304 does not refer literally to the second pixel in that frame, but rather refers to the pixel from stored pixel frame 304 that has a location that is the same as, i.e., corresponds to, the location of the current pixel in current pixel frame 315.) Adder 324 adds the temporal signal change to allow through filter 300 to the value of the second pixel from stored prior filtered pixel frame 304 and outputs the sum on output Out. The sum is the value of the adaptively temporal noise filtered pixel. Output Out of adder 324 is connected to pixel output frame 310. Thus, the adaptively temporal noise filtered pixel is written to pixel output frame 310. Multiplier 323 and adder 324 implement GENERATE PIXEL process 309.

Pixel output frame 310 is processed by any remaining stages in the imaging pipeline (see FIG. 5), and then is sent to a display unit. Since, the frame of pixel data sent to the display unit is the result of the imaging pipeline processing pixel output frame 310, the frame of pixel data sent to the display unit is said to be based on pixel output frame 310. Thus, a frame of pixel data based on pixel output frame 310 is displayed by a display unit, and as indicated above, provides a better image than was obtained with non-adaptive temporal noise filtering.

The noise standard deviation stdCurr of the current pixel is on both of input terminals In1 and In2 of multiplier 325. Multiplier 325 multiplies the two values to generate the square of the noise standard deviation stdCurr$^2$. The square of the noise standard deviation stdCurr$^2$ is driven on output terminal Out, which is connected to a first input terminal In1 of multiplier 330.

The temporal change to allow through filter change is on both of input terminals In1 and In2 of multiplier 326. Multiplier 326 multiplies the two values to generate the square of the temporal change to allow through filter change$^2$. The square of square of the temporal change to allow through filter change$^2$ is driven on output terminal Out, which is connected to a second input terminal In2 of multiplier 330

A first input terminal In1 of adder 327 receives a "1" as an input and inverting second input In2 receives of the temporal change to allow through filter change, which is expressed as a number between zero and one. Adder subtracts percent of the temporal change to allow through filter from one to generate the value (1−change). The value (1−change) is driven on output terminal Out, which is connected to a first input terminal In1 and to a second input terminal In2 of multiplier 329.

Signals on line Control to stored prior pixel noise frame drive the prior filtered pixel noise standard deviation stdPrev corresponding to the current pixel on both input terminals In1 and In2 of multiplier 328. Again, the prior filtered pixel noise standard deviation stdPrev corresponding to the current pixel is the prior filtered pixel noise standard deviation stdPrev at the same location in stored prior pixel noise frame 314 as the location of the current pixel in current pixel frame 315. Multiplier 328 multiplies the two values to generate the square of the prior filtered pixel noise standard deviation stdPrev$^2$. The square of the prior filtered pixel noise standard deviation stdPrev$^2$ is driven on output terminal Out, which is connected to a second input terminal In2 of multiplier 331.

The value (1−change) is on both first input terminal In1 and second input terminal In2 of multiplier 329. Multiplier 329 multiplies the two values to generate the value (1−change)$^2$. The value (1−change)$^2$ is driven on output terminal Out, which is connected to a first input terminal In1 of multiplier 331.

The square of the temporal change to allow through filter change$^2$ is on second input terminal In2 of multiplier 330 and the square of the noise standard deviation stdCurr$^2$ of the current pixel is second input terminal In2 of multiplier 330. Multiplier 330 multiplies the two values to generate the value change$^2$*stdCurr$^2$. The value change$^2$*stdCurr$^2$ is driven on output terminal Out, which is connected to a first input terminal In1 of adder 332.

The square of the noise standard deviation stdPrev$^2$ of the prior filtered pixel corresponding to the current pixel is on second input terminal In2 of multiplier 331 and the value (1−change)$^2$ is on first input terminal In1 of multiplier 331. Multiplier 331 multiplies the two values to generate the value (1−change)$^2$*stdPrev$^2$. The value (1−change)$^2$*stdPrev$^2$ is driven on output terminal Out, which is connected to a second input terminal In2 of adder 332.

Thus, adder 332 receives the value (1−change)$^2$*stdPrev$^2$ on second input terminal In2 and the value change$^2$*stdCurr$^2$ on first input terminal In1. Adder 332 adds the two values to generate the value ((1−change)$^2$*stdPrev$^2$+ change$^2$*stdCurr$^2$). The value ((1−change)$^2$*stdPrev$^2$+ change$^2$*stdCurr$^2$) is driven on output terminal Out, which is connected to input terminal In of square root module 333.

Square root module 333 takes the square root of the value ((1−change)$^2$*stdPrev$^2$+change$^2$*stdCurr$^2$), and stores the result stdOut at the location in pixel noise output frame 312 corresponding to the location of the current pixel in current pixel frame 315, i.e., at the location corresponding to the current pixel in pixel noise output frame 312. Second through seventh multiplier 325, 326, 328, 329, 330, and 331, third and fourth adders 327 and 332, and square root module 333 implement GENERATE PIXEL NOISE process 311.

Figure 5:
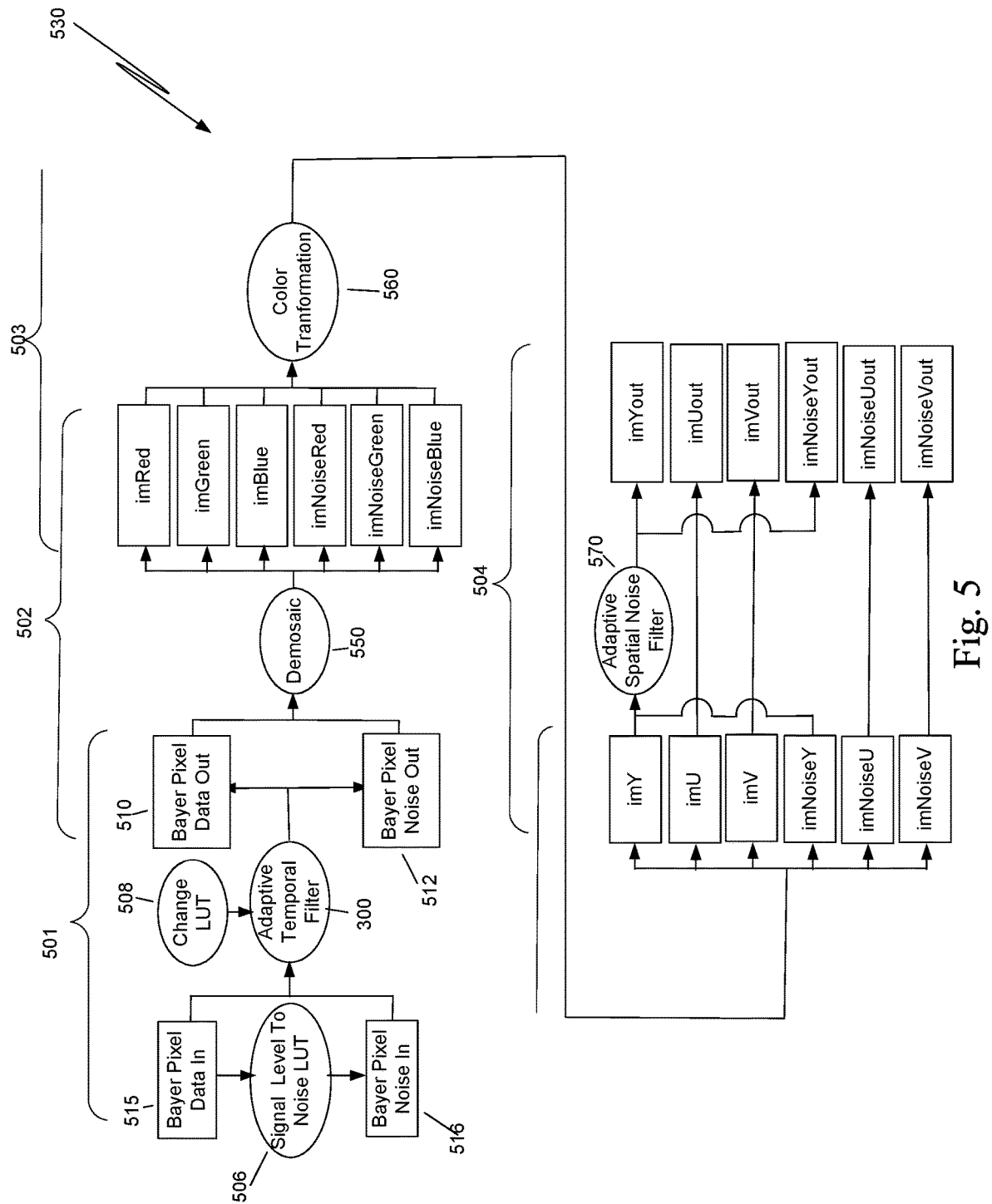
FIG. 5 is a diagram of an imaging pipeline that includes a plurality of adaptive noise filters.

FIG. 5 is a block diagram of representative stages 501 to 504 of an imaging pipeline 530 that includes a plurality of adaptive noise filters. Imaging pipeline 530 is one example of imaging pipeline 230. In this example of an imaging pipeline, adaptive temporal noise filter 300 is included in a first stage 501, and an adaptive spatial noise filter 570 is included in a fourth stage 504. Imaging pipeline 530 outputs a frame to a display unit that is based on the outputs of the adaptive noise filters in the pipeline.

In the example of FIG. 5, image capture unit 201 includes an image capture sensor with a Bayer red-green-blue color filter. Bayer pixel data-in frame 515 is the current pixel frame for adaptive temporal noise filter 300. Here, the Bayer pixel data-in frame 515 includes a set of red pixel data, a set of green pixel data, and a set of blue data. However, in stage 501, the temporal filtering is not dependent on the color attributes of a particular set of pixels—only the signal level of each of the pixels.

As described with respect to FIGS. 3A and 3B, each of the pixels in Bayer pixel data-in frame 515 accesses signal level to noise look-up table 506, and signal level to noise look-up table 506 outputs a noise standard deviation—an estimated pixel noise parameter—for each pixel to Bayer pixel noise in frame 516. Signal level to noise look-up table 506 is equivalent to signal level to noise look-up table 306.

Adaptive temporal noise filter 300 receives Bayer pixel data-in frame 515 and Bayer pixel noise in frame 516 as inputs and uses change look-up table 508 as previously described for change look-up table 308. Change look-up table 508 is equivalent to change look-up table 308. Adaptive temporal noise filter 300 generates an adaptively temporal noise filtered pixel in Bayer pixel data-out frame 510 for each pixel in Bayer pixel data-in frame 515 and generates pixel noise in Bayer pixel noise out frame 512 for each pixel in Bayer pixel data-in frame 515 as described above with respect to FIGS. 3A and 3B, and so that description is not repeated here.

Bayer pixel data-out frame 510 and Bayer pixel noise out frame 512 are input frames to second stage 502, a demosaic stage, of imaging pipeline 530. Demosaic process 550 processes the adaptively temporal noise filtered pixels of Bayer pixel data-out frame 510 to generate a full resolution red pixel frame imRed, a full resolution green pixel frame imGreen, and a full resolution blue pixel frame imBlue. Also, demosaic process 550 processes the pixel noise of Bayer pixel noise data-out frame 512 to generate a full resolution red pixel noise frame imNoiseRed, a full resolution green pixel noise frame imNoiseGreen, and a full resolution blue pixel noise frame imNoiseBlue. The process for demosaicing sets of Bayer red, green, and blue pixels to obtain full resolution frames of red, green, and blue pixels is well-known, and so is not considered in further detail.

Full resolution red pixel frame imRed, full resolution green pixel frame ImGreen, full resolution blue pixel frame imBlue, full resolution red pixel noise frame imNoiseRed, full resolution green pixel noise frame mNoiseGreen, and full resolution blue pixel noise frame imNoiseBlue are input frames to a third stage 503, a color space transformation stage, of imaging pipeline 530. Color transformation process 560 transforms a red pixel, a green pixel, and a blue pixel, i.e., a color pixel in a first color space, into a luminance pixel Y and two chrominance pixels U, V, i.e., into a color pixel in a second color space. The transformation from a RGB color space to a YUV color space is well known and so is not considered in further detail.

Color transformation process 560 transforms full resolution red pixel frame imRed, full resolution green pixel frame ImGreen, and full resolution blue pixel frame imBlue into a full resolution luminance pixel frame imY, a first full resolution chrominance pixel frame ImU, and a second full resolution chrominance pixel frame imV. Color transformation process 560 also transforms full resolution red pixel noise frame imNoiseRed, full resolution green pixel noise frame imNoiseGreen, and full resolution blue pixel noise frame imNoiseBlue into a full resolution luminance pixel noise frame imNoiseY, a first full resolution chrominance pixel noise frame imNoiseU, and a second full resolution chrominance pixel noise frame ImNoiseV.

Full resolution luminance pixel frame imY, first full resolution chrominance pixel frame imU, second full resolution chrominance pixel frame imV, full resolution luminance pixel noise frame ImNoiseY, first full resolution chrominance pixel noise frame ImNoiseU, and second full resolution chrominance pixel noise frame imNoiseV are inputs to a fourth stage 504, an adaptive spatial noise filter stage, of imaging pipeline 530.

One of the reasons to transform from the RGB color space to the YUV color space is that most of the intensity information that is important to human visual perception is carried in luminance component Y of the YUV color space. Thus, in stage 504, adaptive spatial noise filter 570 only adaptively filters spatial noise of luminance component pixels. This provides enhancement of the final displayed image without the time and expense of adaptively filtering the spatial noise of the pixels of the two chrominance components. However, if a color transformation is not used in imaging pipeline 530, or the color transformation is into another color space that does not include a luminance component, adaptive spatial noise filter 570 would adaptively spatial noise filter the pixels of each of the color components.

Full resolution luminance pixel frame imY and full resolution luminance pixel noise frame imNoiseY are inputs to adaptive spatial noise filter 570. The value of a pixel in full resolution luminance pixel noise frame imNoiseY represents the noise component of a corresponding pixel in full resolution luminance pixel frame imY, i.e., a pixel at a same location in the frame imY as the location of the pixel noise in frame imNoiseY. The pixel noise value in frame imNoiseY is used in specifying the filter for the corresponding pixel in frame imY, and so it is said that the filter is an adaptive spatial noise filter. The filter is adapted for the spatial noise associated with each pixel, instead of assuming that the same constant parameters can be used in the spatial noise filter for all the pixels.

Adaptive spatial noise filter 570 generates an output frame ImYout of adapatively spatial noise filtered pixels and an output frame of pixel noise imNoiseYout. Chrominance pixel frame imU and chrominance pixel frame imV are output unfiltered as chrominance pixel frame imUout and chrominance pixel frame ImVout, respectively. Chrominance pixel noise frame imNoiseU and chrominance pixel noise frame imNoiseV are output unfiltered as chrominance pixel noise frame ImNoiseUout and chrominance pixel noise frame imNoiseVout. In one aspect, frame imYout of adapatively spatial noise filtered pixels, chrominance pixel frame imUout and chrominance pixel frame imVout are output from pipeline stage 504. These frames may be further processed in the pipeline and sent to a display device, or in one aspect, may be sent to the display device.

In one aspect, adaptive spatial noise filter 570 is implemented as an adaptive spatial noise bilateral filter, e.g., $$\tilde{I}(x) = (\text{Distance Filter}) * (\text{Range Filter(Noise)})$$

where
$\tilde{I}(x)$ is the filtered signal level of the pixel at location x in a frame.

Adaptive spatial noise filter 570 uses a square block of pixels, e.g., a plurality of neighboring pixels, around a current pixel to determine how to filter the current pixel. The distance filter filters the current pixel based on weights determined from the Euclidean distance of adjacent pixels in the block from the current pixel. The signal range filter, sometimes called a range filter or an intensity filter, is an adaptive noise signal range filter based on the value of the pixel noise in frame imNoiseY corresponding to the pixel being filtered. Thus, the weights used in the range filter are based not only on differences in signal levels between the adjacent pixels in the block and the current pixel, but also on the noise component of the current pixel. The pixel noise in the pixel noise input frame at the same location as the location of current pixel in the input pixel frame is said to correspond to the current pixel and is sometimes referred to as the noise component of the current pixel.

Non-noise adaptive bilateral filters are known. See for example, C. Tomasi and R. Manduchi, "Bilateral Filtering for Gray and Color Images," *Proceeding of the* 1998 *IEEE International Conference on Computer Vision*, Bombay India, pp. 839-846 (1998), which is incorporated herein by reference as a demonstration of the knowledge in the field.

As in the prior art bilateral filters, adaptive spatial noise filter 570 is a nonlinear, edge-preserving filter. However, as just mentioned, unlike the prior art bilateral filter, for a pixel, the adaptive spatial noise filter adjusts the weights used in the filter not only based on the Euclidean distance of adjacent pixels from the pixel, but also based on differences in signal levels between the adjacent pixels and the current pixel and based on the noise component of the current pixel. Specifically, as explained more completely below, adaptive spatial noise filter 570 takes a weighted sum of the pixels in a neighborhood of the current pixel. The weights depend on the spatial distance and on the signal levels of the neighboring pixels as well as the noise component of the current pixel itself. Thus, the signal value at each pixel in a frame is replaced by a noise-based weighted average of signal values from nearby pixels.

Unlike previous implementation of the bilateral filter that relied on a constant signal range parameter $\sigma_r$ for all pixels to archive the effect of edge preserving while averaging and diminishing noise, adaptive spatial noise filter 570 adjusts a signal range parameter $\sigma_r$ for each pixel based on the noise component of that pixel. Thus, each pixel in a frame is bilaterally filtered based on the noise associated with the pixel, i.e., the spatial bilateral filter adapts to the noise of each pixel.

The following expressions are the definition of adaptive spatial noise filter 570 implemented in imaging pipeline 530 in one aspect.

$$\tilde{I}(x) = \frac{1}{C} \sum_{y \in N(x)} e^{-\frac{\|y-x\|^2}{2\sigma_d^2}} * e^{-\frac{|I(y)-I(x)|^2}{2\sigma(Noise)_r^2}} * I(y)$$

$$C = \sum_{y \in N(x)} e^{-\frac{\|y-x\|^2}{2\sigma_d^2}} * e^{-\frac{|I(y)-I(x)|^2}{2\sigma(Noise)_r^2}}$$

where
$\tilde{I}(x)$ is the filtered signal level of the pixel at location x;
C is a normalization constant;

$$e^{-\frac{\|y-x\|^2}{2\sigma_d^2}}$$

is a spatial Gaussian distribution;
$\|y-x\|$ is the norm of the distance between the pixel at location y and the pixel at location x;
$\sigma_d$ is a distance parameter, usually in the range of 1 to 10;

$$e^{-\frac{|I(y)-I(x)|^2}{2\sigma(Noise)_r^2}}$$

is a signal level range Gaussian distribution that is a function of noise of the current pixel at location x;
I(y) is the signal level of the pixel at location y;
I(x) is the signal level of the pixel at location x;
|I(y)−I(x)| is the absolute value of the difference between the signal level of the pixel at location y and the signal level of the pixel at location x;
$\sigma(Noise)_r$ is a signal level range parameter that is a function of the noise of the pixel at location x;
N(x) is a block of pixels with a center pixel at location x; and
$\Sigma_{y \in N(x)}$ represents a summation over the pixels in the block of pixels with a center pixel at location x.

Note that location x and location y specify locations in the block of pixels, and each location is expressed by two coordinates.

Figure 6A:
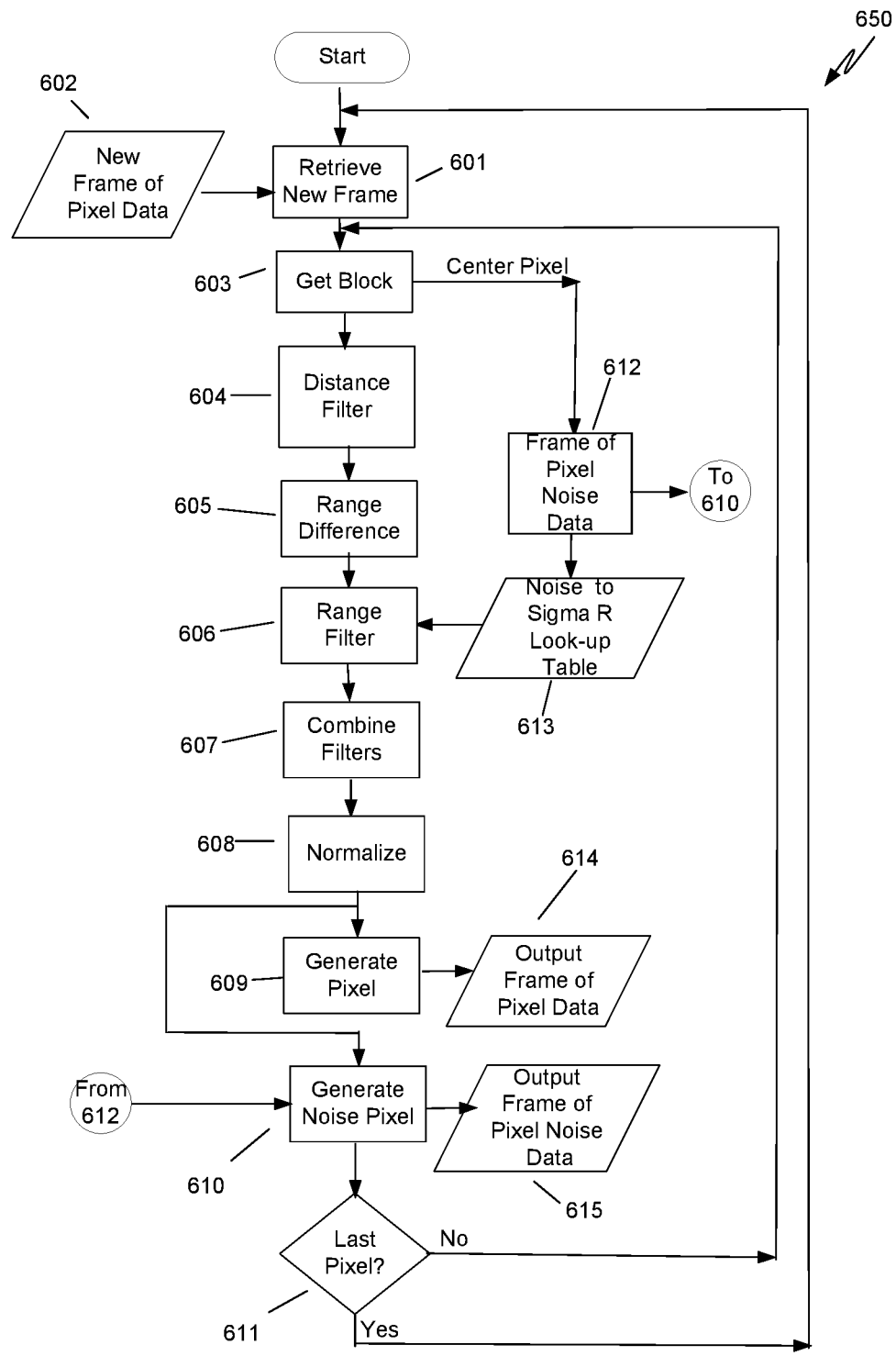
FIG. 6A is a method of implementing an adaptive spatial noise filter.
Figure 6B:
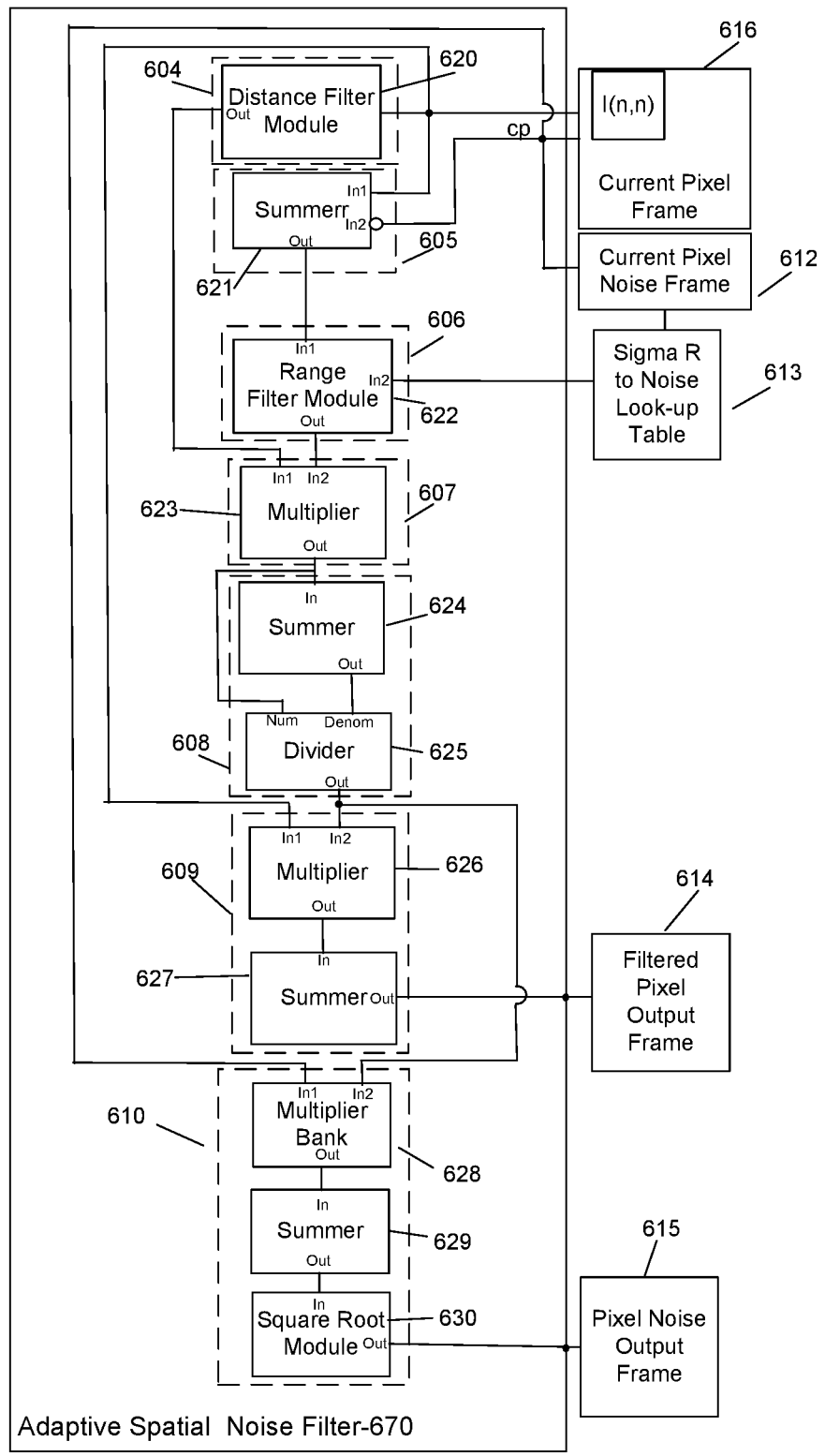
FIG. 6B is a diagram of an adaptive spatial noise filter.

FIG. 6A is a process flow diagram for one implementation of a method 650 for adaptive spatial noise pixel filtering. FIG. 6B is a block diagram of one implementation of method 650 of FIG. 6A in an adaptive spatial noise filter 670. In one aspect, adaptive spatial noise filter 670 can be used in imaging pipeline 230 and in imaging pipeline 530. Adaptive spatial noise filter 670 is an example of adaptive spatial noise filter 570.

Initially, RETRIEVE NEW FRAME process 601 retrieves a new pixel frame 602, e.g., frame imY. RETRIEVE NEW FRAME process 601 transfers to GET BLOCK process 603.

GET BLOCK process 603 retrieves an input n by a block of pixels centered around a current pixel from current pixel frame 616 (FIG. 6B). Each pixel in a frame is adaptively spatial noise filtered or at least a plurality of pixels in a frame is adaptively spatial noise filtered, and so the current pixel is the pixel that is being adaptively spatial noise filtered. In one aspect, the input n by a block of pixels is a five pixel by five pixel block with the current pixel at the center of the block. GET BLOCK process 603 transfers to DISTANCE FILTER process 604.

DISTANCE FILTER process 604 generates a value of the spatial Gaussian function defined above for each pixel in the input block of pixels, i.e., for each pixel in the input block of pixels, and so generates a distance filter value for each location in an n by n block of distance filter values. DISTANCE FILTER process 604 transfers to a RANGE DIFFERENCE process 605.

RANGE DIFFERENCE process 605 determines a difference in signal level between the current pixel and each of the other pixels in the input block of pixels. Specifically, RANGE DIFFERENCE process 605 evaluates $I(y)-I(x)$ where x is the location of the center pixel in the block, $I(x)$ is the value of the center pixel, $I(y)$ is the value of the pixel at location y in the input block of pixels, and y ranges over the locations in the input block of pixels, and generates a range difference for each location in an n by n block of range differences. RANGE DIFFERENCE process 605 transfers to RANGE FILTER process 606.

RANGE FILTER process 606 implements the signal level range Gaussian distribution that is a function of noise of the current pixel as described above. To implement the signal level range Gaussian distribution, RANGE FILTER process 606 needs the noise dependent value of signal level range parameter $\sigma(Noise)_r$ for the current pixel. Here, Noise being included within parentheses in signal level range parameter $\sigma(Noise)_r$ means that signal level range parameter $\sigma_r$ is a function of the noise component of the current pixel. The result of this functionality is that the range filter in the bilateral filter is adaptive and changes based on the noise component of the pixel being bilaterally filtered. Consequently, the spatial noise filter is adaptive to noise, and so is referred to as an adaptive spatial noise filter. Thus, the adaptive spatial noise filter compares the signal level of the current pixel to the signal levels of a plurality of neighboring pixels and to an estimated pixel noise parameter by dividing the square of the absolute value of the difference between the signal level of the pixel at location y and the signal level of th pixel at location x by the square of signal level range parameter $\sigma(Noise)_r$. Here, signal level range parameter $\sigma(Noise)_r$ is the estimated pixel noise parameter for this aspect. This comparison is used in outputting the adaptively spatial noise filtered pixel value.

In one aspect (not shown), signal level range parameter $\sigma(Noise)_r$ is a linear function of the noise component of the current pixel. In this aspect, the location of the current pixel is used to retrieve the pixel noise from a corresponding location, e.g., the same location, in a frame of pixel noise data, which is input to the stage of the pipeline. The pixel noise that is retrieved corresponds to the center pixel. The pixel noise, which is the noise component of the center pixel, is input to the linear function to obtain signal level range parameter $\sigma(Noise)_r$. For imaging pipeline 530, the input frame of pixel noise data 612 is frame imNoiseY. In one aspect, the slope of the linear function is between 2 and 3. The slope and offset are empirically determined, in one aspect, by using different values as the slope and offset, filtering a noisy image with the adaptive spatial filters for each of the values, and then selecting the values that produce the best filtered image, as determined by a group of observers.

In another aspect, as illustrated in FIG. 6A, the location of the current pixel is used to retrieve the pixel noise from a frame of pixel noise data 612, and the pixel noise is input to a Noise to Sigma R Look-up Table 613. This table is empirically generated using a procedure equivalent to that just described for the linear function, but a more complex curve is used. Thus, Noise to Sigma R Look-up Table 613 includes a signal level range parameter $\sigma(Noise)_r$ for each of a plurality of pixel noise levels, where the plurality of pixel noise levels includes a range of pixel noise commonly encountered in a surgical image, in this aspect. Noise to Sigma R Look-up Table 613 outputs a signal level range parameter $\sigma(Noise)_r$ to RANGE FILTER process 606 corresponding to the input pixel noise, and so outputs a signal level range parameter $\sigma(Noise)_r$ dependent on the noise component of the current pixel.

Thus, RANGE FILTER process 606 generates an n by n block of range filtered values, where a range filtered value at a given location in the n by n block of range filtered values is the value of the signal level range Gaussian distribution using the input range difference from a same location in the n by n block of range differences as the given location, e.g., from the corresponding location, and the input signal level $\sigma(Noise)_r$. Thus, RANGE FILTER process 606 transfers to COMBINE FILTERS process 607.

COMBINE FILTERS process 607 multiplies a value at a location in the n by n block of the distance filter values by the value at the same location in the n by a block of range filter values for each location in the two blocks, and so generates a combined filter value for each location in a n by n block of combined filter values. COMBINE FILTERS process 607 transfers to NORMALIZE process 608.

NORMALIZE process 608 first determines the value of normalization constant C, defined above. Specifically, NORMALIZE process 608 sums the values in the a by a block of combined filter values to generate normalization constant C. Next, NORMALIZE process 608 divides the value at each location in the a by n block of combined filter values by normalization constant C to generate an a by a block of normalized combined filter values. NORMALIZE process 608 transfers to GENERATE PIXEL process 609.

GENERATE PIXEL process 609 generates the adaptively spatial noise filtered pixel and writes the adaptively spatial noise filtered pixel to output frame of filtered pixel data 614, sometimes referred to as output frame of pixel data or filtered pixel output frame. Specifically, GENERATE PIXEL process 609 generates an applied filter value for a location in a n by n block of applied filter values by multiplying the value at the same location of the n by n block of normalized combined filter values by the value of the pixel at the same location of the n by n input pixel block. The multiplication is done for each location in the blocks. Finally, to generate the adaptively spatial noise filtered pixel for the pixel at the center of block, GENERATE PIXEL process 609 sums values in the n by n block of applied filter values to obtain the adaptively spatial noise filtered pixel, which is written to the appropriate location in output frame of filtered pixel data 614, i.e., to the same location in output frame of filtered pixel data 614 as the location of the center pixel in current pixel frame 616. Output frame of filtered pixel data 614 is sometimes referred to as filtered pixel data output frame 614.

GENERATE PIXEL NOISE process 610 is optional, and typically is implemented if there is another filter stage later in the pipeline that utilizes an adaptive noise filter. Above, the normalization constant C was defined as:

$$C = \sum_{y \in N(x)} e^{-\frac{\|y-x\|^2}{2\sigma_d^2}} * e^{-\frac{|I(y)-I(x)|^2}{2\sigma(Noise)_r^2}}$$

In determining normalization constant C, an n by n block of combined filter values were generated, and a combined filter value at a location in the block Cxy can be expressed as:

$$Cxy = e^{-\frac{\|y-x\|^2}{2\sigma_d^2}} * e^{-\frac{|I(y)-I(x)|^2}{2\sigma(Noise)_r^2}}$$

Also, as explained above, the value at each location in the n by n block of combined filter values was divided by normalization constant C to generate a n by n block of normalized combined filter values CFN, which is represented as:

$$\begin{matrix} CFN_{1,1} & CFN_{1,2} & \ldots & CFN_{1,(n-1)} & CFN_{1,n} \\ CFN_{2,1} & CFN_{2,2} & \ldots & CFN_{2,(n-1)} & CFN_{2,n} \\ \cdot & \cdot & \ldots & \cdot & \cdot \\ \cdot & \cdot & & \cdot & \cdot \\ \cdot & \cdot & & \cdot & \cdot \\ CFN_{(n-1),1} & CFN_{(n-1),2} & \ldots & CFN_{(n-1),(n-1)} & CFN_{(n-1),n} \\ CFN_{n,1} & CFN_{n,2} & \ldots & CFN_{n,(n-1)} & CFN_{n,n} \end{matrix}$$

GENERATE PIXEL NOISE process 610 receives this n by n block of normalized combined filter values CFN from NORMALIZE process 608. Also, for each pixel in the n by n block of pixels centered around the current pixel there is a corresponding noise standard deviation pixel stdPix$_{i,j}$ in frame of pixel noise data 612. Noise output standard deviation pixel stdOut for the current pixel is defined as:

$$stdOUT = (CFN_{1,1}^2 * stdPix_{1,1}^2 + CFN_{1,2}^2 * stdPix_{1,2}^2 + \ldots + CFN_{n,(n-1)}^2 * stdPix_{n,(n-1)}^2 + CFN_{n,n}^2 * stdPix_{n,n}^2)^{1/2}$$

Noise output standard deviation pixel stdOut is passed to pixel noise output frame 615, sometimes referred to as output frame of pixel noise data 615. GENERATE PIXEL NOISE process 610 transfers processing to LAST PIXEL check process 611.

LAST PIXEL check process 611 determines whether all the pixels in the current pixel frame have been filtered. If all the pixels have been filtered, LAST PIXEL check process 611 transfers to RETRIEVE NEW FRAME process 601, and otherwise transfers to GET BLOCK process 603.

The following is a pseudo code implementation of one aspect of adaptive spatial noise filter 670.

```
sigmaD = 1                              % sigma value for distance filter
I = [5, 5]                              % define size of block
distFilt = fspecial('gausian', [5, 5], 10)   % evaluate distance filter for each location
                                        % in block
cp = I(3, 3)                            % define center pixel
diff = I - cp                           % the signal level difference between
                                        % each % pixel and the center pixel
np = location of cp in noise frame      % define pixel noise corresponding to
                                        % center pixel
sigmaR = lookup(np)                     % obtain sigmaR as a function of noise
                                        % pixel corresponding to center pixel
rangeFilt = exp(-diff.^2/(2*sigmaR^2))) % evaluate range filter for each location in
                                        % block
combFilt = rangeFilt.*distFilt          % multiply each component of the range
                                        % filter by the correspond component of
                                        % the distance filter
sumFil = sum(combFilt(:))               % sum up values of the combined filter
combFiltNorm = comFilt./sumFilt         % divide each value of the combination
                                        % filter by the normalization factor
appliedFilter = I.*comFiltNorm          % multiply each pixel in the block by the
                                        % normalized combined filter
newValue = sum(appliedFilter(:))        % filtered center pixel is sum of values in
                                        % the applied filter
```

In one aspect the adaptive spatial noise filter is written in a computer programming language and compiled into an executable module that can be executed on a processor in the imaging pipeline. Alternatively, the adaptive spatial filter can be implemented in hardware, in firmware, or in any combination of hardware, firmware, and a combination of a processor and an executable module. For example, see FIG. 6B.

Adaptive spatial noise filter 670 is one example of a filter that performs method 650 of FIG. 6A. Adaptive spatial noise filter 670 includes a distance filter module 620, a first summer 621, a range filter module 622, a first multiplier 623, a second summer 624, a divider 625, a second multiplier 626, a third summer 627, a multiplier bank 628, a fourth summer 629, and a square root module 630. Adaptive spatial noise filter 670 is connected to a current pixel frame 616, a current pixel noise frame 612, a noise to sigma R look-up table 613, an output frame of filtered pixel data 614, and a pixel noise output frame 615. In one aspect, each of current pixel frame 616, current pixel noise frame 612, noise to sigma R look-up table 613, filtered pixel output frame 614, and pixel noise output frame 615 is stored in memory.

Showing current pixel frame 616, current pixel noise frame 612, noise to sigma R look-up table 613, filtered pixel output frame 614, and pixel noise output frame 615 as being separate from adaptive spatial noise filter 670 is illustrative only. For example, adaptive spatial noise filter 670 could have been drawn in FIG. 6B to include all or some combination of current pixel frame 616, current pixel noise frame 612, noise to sigma R look-up table 613, filtered pixel output frame 614, and pixel noise output frame 615.

To implement GET BLOCK process 603, control signals are supplied to current pixel frame 616, sometimes referred to as frame 616, so that a block of pixels I(n,n) is supplied to distance filter module 620 and to a first input of summer 621, and so that center pixel cp of block I(n,n) is supplied to a second inverting input In2 of summer 621 of adaptive spatial noise filter 670. Here, n is a positive non-zero odd integer.

As noted above, the center pixel is sometimes referred to as the current pixel. Also, when it said that a pixel is driven on or supplied to an input, it means the value of the pixel is on the input.

Distance filter module 620 implements the spatial Gaussian function defined above for each pixel in block I(n,n), i.e., for each location in block I(n,n), and so generates a distance filter value for each location in block I(n,n). Distance filter module 620 implements DISTANCE FILTER process 604.

Summer 621 subtracts the value of the center pixel from each value in block I(n,n), i.e., summer 621 determines a difference in signal level between the current pixel and each of the other pixels in block I(n,n) to generate a n by n block of signal level range differences. Summer 621 outputs the n by n block of signal level range differences on output Out. Summer 621 implements RANGE DIFFERENCE process 605.

Range filter module 622 implements the signal level range Gaussian distribution that is a function of noise of the current pixel as described above. To implement the signal level range filter module 622 needs the noise dependent value of signal level range parameter σ(Noise)$_r$ for the center pixel of block I(n,n).

In this aspect, the location of current pixel cp is used to retrieve pixel noise at the same location in a frame of pixel noise data 612, and the pixel noise is input to Noise to Sigma R Look-up Table 613. The pixel noise retrieved is the pixel noise that corresponds to the center pixel of block I(n,n). In response to the input pixel noise, Noise to Sigma R Look-up Table 613 provides a signal level range parameter σ(Noise)$_r$ to range filter module 622 on second input In2. Range filter module 622 receives the n by n block of signal level range differences from summer 621 on a first input In1.

Thus, range filter module 622 generates a range filtered value of each location in block I(n,n). A range filtered value at a given location in a n by a block of range filtered values is the value of the signal level range Gaussian distribution using the input range difference for that given location in the n by n block of signal level range difference and the input signal level σ(Noise)$_r$. Range filter module 622 implements RANGE FILTER process 606.

Multiplier 623 on a first input In1 receives the n by a block of distance filter values and on a second input terminal In2 receives the n by n block of range filter values. Multiplier 623 multiplies a distance filter value of the n by n block of distance filter values by a corresponding range filter value of the n by n block of range filters and puts the result in a corresponding location of a n by n combined filter block. Here, a distance filter value at location (1,1) of the block of distance filter values corresponds to a range filter value at location (1,1) of the block of range filter values, and to a combined filter value at location (1,1) of the block of combined filter values; a distance filter value at location (1,2) of the block of distance filter values corresponds to a range filter value at location (1,2) of the block of range filter values, and to a combined filter value at location (1,2) of the block of combined filter values; . . . a distance filter value at location (2,1) of the block of distance filter values corresponds to a range filter value at location (2,1) of the block of range filter values, and to a combined filter value at location (2,1) of the block of combined filter values, etc. Thus, in general herein, entries at the same locations in two n by n block are said to correspond. The n by n block of combined filter values is provided on output Out of multiplier 623. Multiplier 623 implements COMBINE FILTERS process 607.

Summer 624 receives the n by n block of combined filter values on input In. Summer 624 sums the values in the a by n block of combined filter values to generate normalization constant C, defined above. Normalization constant C is provided on output Out of summer 624.

Divider 625 receives the n by n block of combined filter values on numerator input Num and receives normalization constant C on denominator terminal Denom. Divider 625 divides each of the combined filters in the n by n block of combined filter values by normalization constant C to generate an n by n block of normalized combined filter values. The n by a block of normalized combined filter values is provided on output Out of divider 625. Summer 624 and divider 625 implement NORMALIZE process 608.

Multiplier 626 received pixel block I(n,n) on a first input In1 and n by n block of normalized combined filter values on a second input 1n2. Multiplier generates a n by n block of applied filter values by multiplying each of the normalized combined filter values by the corresponding pixel in pixel block I(n,n). Again, the pixel value at location (1,1) of the block of pixels corresponds to normalized combined filter value at location (1,1) of the block of normalize combined filter values and the applied filter value at location (1,1) of the block of applied filter values; the pixel value at location (1,2) of the block of pixels corresponds to normalized combined filter value at location (1,2) of the block of normalize combined filter values and the applied filter value at location (1,1) of the block of applied filter values, etc. The n by n block of applied filter values is supplied on output OUT of multiplier 626.

Summer 627 receives the n by n block of applied filter values on input IN. Summer 624 sums the values in n by n block of applied filter values to generate the adaptively spatial noise filtered pixel for the center pixel of pixel block I(n,n). The adaptively spatial noise filtered pixel for the center pixel is provided on output OUT of summer 627, and so is written to the appropriate location in filtered pixel output frame 614, i.e., the same location in filtered pixel output frame 614 as the location of center pixel cp in current pixel frame 616. Multiplier 627 and summer 627 implement GENERATE PIXEL process 609.

Multiplier bank 628 on a first input In1 receives the n by n block of pixel noise standard deviations stdPix$_{i,j}$ from frame of pixel noise data 612 and on a second input terminal In2 receives the n by n block of normalized combined filter values. Multiplier bank 623 multiplies each of the input value by itself, and the multiplies the squared value in one block by the corresponding squared value in the other block.. The n by n block of the product of a pixel noise standard deviation squared and the normalized combined filtered value squared is provided on output Out of multiplier bank 628, which drives input terminal In of summer 629.

Summer 629 receives the n by n block of the product of pixel noise standard deviation squared and the normalized combined filtered value squared on input In. Summer 624 sums the values in n by n block of the product of pixel noise standard deviation squared and the normalized combined filtered value squared. The result is provided on output Out of summer 629.

Square root module 630 receives on input In the result on output Out of summer 629. Square root module 630 takes the square root of the input value and supplies noise output standard deviation pixel stdOut to pixel noise output frame 615. Multiplier bank 628, summer 629, and square root module 630 implements GENERATE PIXEL NOISE process 610.

The adaptive noise filters described above may be implemented in practice by any number of modules and each module may include any combination of components. Each module and each component may include hardware, software that is executed on a processor, and firmware, or any combination of the three. Also, the functions and acts of an adaptive noise filter, as described herein, may be performed by one module, or divided up among different modules or even among different components of a module. When divided up among different modules or components, the modules or components may be centralized in one location or distributed across a computer-assisted surgical system for distributed processing purposes. Thus, references to an adaptive noise filter should not be interpreted as requiring a single physical entity.

In the above examples, a single imaging pipeline has been shown and described. However, in a system that utilizes stereoscopic scenes, a second pipeline identical to the pipelines described above would be used so that one pipeline processed a left captured frame from a left image capture unit, and another pipeline process a right capture frame from a right image capture unit. Repeating the above description for the second pipeline would be redundant, and so is not included herein for clarity.

As used herein, "first," "second," "third," etc. are adjectives used to distinguish between different components or elements. Thus, "first," "second," and "third" are not intended to imply any ordering of the components or elements or to imply any total number of components or elements.

The above description and the accompanying drawings that illustrate aspects and embodiments of the present inventions should not be taken as limiting—the claims define the protected inventions. Various mechanical, compositional, structural, electrical, and operational changes may be made without departing from the spirit and scope of this description and the claims. In some instances, well-known circuits, structures, and techniques have not been shown or described in detail to avoid obscuring the invention.

Further, this description's terminology is not intended to limit the invention. For example, spatially relative terms— such as "beneath", "below", "lower", "above", "upper", "proximal", "distal", and the like—may be used to describe one element's or feature's relationship to another element or feature as illustrated in the figures. These spatially relative terms are intended to encompass different positions (i.e., locations) and orientations (i.e., rotational placements) of the device in use or operation in addition to the position and orientation shown in the figures. For example, if the device in the figures were turned over, elements described as "below" or "beneath" other elements or features would then be "above" or "over" the other elements or features. Thus, the exemplary term "below" can encompass both positions and orientations of above and below. The device may be otherwise oriented (rotated 90 degrees or at other orientations) and the spatially relative descriptors used herein interpreted accordingly. Likewise, descriptions of movement along and around various axes include various special device positions and orientations.

The singular forms "a", "an", and "the" are intended to include the plural forms as well, unless the context indicates otherwise. The terms "comprises", "comprising", "includes", and the like specify the presence of stated features, steps, operations, elements, and/or components but do not preclude the presence or addition of one or more other features, steps, operations, elements, components, and/or groups. Components described as coupled may be electrically or mechanically directly coupled, or they may be indirectly coupled via one or more intermediate components.

All examples and illustrative references are non-limiting and should not be used to limit the claims to specific implementations and embodiments described herein and their equivalents. Any headings are solely for formatting and should not be used to limit the subject matter in any way, because text under one heading may cross reference or apply to text under one or more headings. Finally, in view of this disclosure, particular features described in relation to one aspect or embodiment may be applied to other disclosed aspects or embodiments of the invention, even though not specifically shown in the drawings or described in the text.

Embodiments described above illustrate but do not limit the disclosure. It should also be understood that numerous modifications and variations are possible in accordance with the principles of the present disclosure. For example, in many aspects the devices described herein are used as single-port devices; i.e., all components necessary to complete a surgical procedure enter the body via a single entry port. In some aspects, however, multiple devices and ports may be used.

We claim:

1. A system comprising:
   an image sensor configured to capture a first frame of pixel data;
   an imaging pipeline coupled to the image sensor to receive the first frame of pixel data, the imaging pipeline including an adaptive noise filter, the adaptive noise filter being configured to:
      filter a first pixel using an estimated pixel noise level of the first pixel, and using a difference between a signal level of the first pixel and at least a signal level of a second pixel, the second pixel being in a previous frame captured by the image sensor prior in time to the capture of the first frame, the adaptive noise filter being configured to filter the first pixel based on a comparison of a change in the signal levels of the first and second pixels to the estimated pixel noise level of the first pixel; and
      output a second frame of pixel data including the filtered first pixel;
   the imaging pipeline being configured to output an output frame of pixel data based on the second frame of pixel data; and
   a display device coupled to the imaging pipeline to receive the output frame of pixel data, the display device being configured to display the output frame of pixel data.

2. The system of claim 1, the adaptive noise filter comprising an adaptive temporal noise filter, the second pixel being at a same location in the previous frame as a location of the first pixel in the first frame.

3. The system of claim 2, the imaging pipeline including a plurality of stages, the adaptive temporal noise filter being included in a first stage of the plurality of stages.

4. The system of claim 2, the adaptive temporal noise filter being configured to output pixel noise corresponding to the filtered first pixel to a noise output frame.

5. The system of claim 1, the imaging pipeline including a plurality of stages, each of the plurality of stages following a first stage of the plurality of stages being configured to process an input pixel noise frame and configured to output a stage dependent pixel noise frame.

6. The system of claim 1, the imaging pipeline including an additional adaptive noise filter, the additional adaptive noise filter being configured to filter the first pixel based on a difference between a signal level of the first pixel and each of the signal levels of a plurality of pixels neighboring the first pixel and based on a noise dependent signal level parameter, wherein the noise dependent signal level parameter is a function of noise of the first pixel, wherein the noise dependent signal level parameter is the estimated pixel noise level of the first pixel.

7. The system of claim 6, the additional adaptive noise filter comprising an adaptive spatial noise filter including a distance filter and a signal level range filter, the signal level range filter being configured to filter the first pixel based on a difference between a signal level of the first pixel and each of the signal levels of the plurality of neighboring pixels.

8. The system of claim 6, wherein the noise dependent signal level parameter is a signal level range parameter.

9. The system of claim 1, the adaptive noise filter comprising an adaptive temporal noise filter, the adaptive temporal noise filter comprising a signal level to noise look-up table and a change look-up table,
the signal level to noise look-up table being configured to receive a value of the first pixel and to output a noise standard deviation corresponding to the signal level of the first pixel; and
the change look-up table being configured to receive a temporal signal change of a pixel expressed in number of noise standard deviations and to output an allowed percentage of temporal change in the signal level of the pixel.

10. The system of claim 9, the adaptive temporal noise filter being configured to output pixel noise corresponding to the filtered first pixel to a noise output frame.

11. The system of claim 1, the imaging pipeline including an additional adaptive noise filter, the additional adaptive noise filter comprising an adaptive spatial noise bilateral filter, wherein the first pixel is a pixel at a location x, and wherein the adaptive spatial noise bilateral filter is defined as:

$$\tilde{I}(x) = \frac{1}{C} \sum_{y \in N(x)} e^{-\frac{\|y-x\|^2}{2\sigma_d^2}} * e^{-\frac{|I(y)-I(x)|^2}{2\sigma(Noise)_r^2}} * I(y)$$

$$C = \sum_{y \in N(x)} e^{-\frac{\|y-x\|^2}{2\sigma_d^2}} * e^{-\frac{|I(y)-I(x)|^2}{2\sigma(Noise)_r^2}}$$

where
$\tilde{I}(x)$ is an adaptively spatial noise filtered signal level of the pixel at location x;
C is a normalization constant;

$$e^{-\frac{\|y-x\|^2}{2\sigma_d^2}}$$

is a spatial Gaussian distribution;
$\|y-x\|$ is a norm of a distance between a pixel at a location y and the pixel at the location x;
$\sigma_d$ is a distance parameter;

$$e^{-\frac{|I(y)-I(x)|^2}{2\sigma(Noise)_r^2}}$$

is a signal level range Gaussian distribution that is a function of noise of the pixel;
I(y) is the signal level of the pixel at the location y;
I(x) is the signal level of the pixel at the location x;
|I(y)−I(x)| is an absolute value of a difference between the signal level of the pixel at the location y and the signal level of the pixel at the location x;
$\sigma(Noise)_r$ is a signal level range parameter that is a function of noise of the pixel at the location x;
N(x) is a block of pixels with a center pixel at the location x; and
$\Sigma_{y \in N(x)}$ represents a summation over pixels in the block of pixels with a center pixel at the location x.

12. A method comprising:
receiving a first pixel of a first frame;
adaptively noise filtering the first pixel using an estimated pixel noise level of the first pixel and using a difference between a signal level of the first pixel and at least a signal level of a second pixel to obtain a filtered pixel, the second pixel being in a second frame captured by the image sensor prior in time to the capture of the first frame, wherein the adaptively noise filtering the first pixel is based on a comparison of a change in the signal levels of the first and second pixels to the estimated pixel noise level of the first pixel; and
outputting the filtered pixel to an output frame.

13. The method of claim 12, the second pixel being at a same location in the second frame as a location of the first pixel in the first frame the change in the signal levels of the first and second pixels being a temporal change in the signal level of the first pixel.

14. The method of claim 13, the adaptively temporal noise filtering the first pixel comprising:
inputting a signal level of the first pixel to a signal level to noise look-up table; and
outputting by the signal level to noise look-up table a noise standard deviation corresponding to the signal level of the first pixel, the noise standard deviation being the estimated pixel noise level of the first pixel.

15. The method of claim 14, the adaptively temporal noise filtering the first pixel further comprising:
dividing the temporal change in the signal level of the first pixel by the noise standard deviation to obtain a temporal change in the signal level of the first pixel in standard deviations of noise, the dividing being the comparison.

16. The method of claim 15, the adaptively temporal noise filtering the first pixel further comprising:

inputting the temporal change in the signal level of the first pixel in standard deviations of noise to a change look-up table; and outputting by the change look-up table an allowed percentage of temporal change in the signal level of the first pixel to pass through the filter.

17. The method of claim 16, the adaptively temporal noise filtering the first pixel further comprising:

creating an allowed temporal change in the signal level of the first pixel by multiplying the allowed percentage of temporal change in the signal level of the first pixel by the temporal change in the signal level of the first pixel; and generating the filtered pixel by adding the allowed temporal change in the signal level of the first pixel to a corresponding pixel, the corresponding pixel being a pixel in the second frame, the second frame immediately preceding the first frame in time.

18. The method of claim 12, further comprising adaptively spatial noise filtering the first pixel based on a difference between a signal level of the first pixel and each of the signal levels of a plurality of pixels neighboring the first pixel and based on a noise dependent signal level parameter, wherein the noise dependent signal level parameter is a function of noise of the first pixel, and wherein the noise dependent signal level parameter is the estimated pixel noise level of the first pixel.

19. The method of claim 18, the adaptively spatial noise filtering the first pixel comprising:

generating the filtered pixel by combining a distance filter and a signal level filter, the signal level filter being a function of the noise dependent signal level parameter.

20. The method of claim 19, the signal level filter comprising a signal level range Gaussian distribution having a signal level range parameter, the signal level range parameter being the noise dependent signal level parameter.

* * * * *